United States Patent
Doo et al.

(10) Patent No.: US 10,223,311 B2
(45) Date of Patent: Mar. 5, 2019

(54) SEMICONDUCTOR MEMORY DEVICE FOR SHARING INTER-MEMORY COMMAND AND INFORMATION, MEMORY SYSTEM INCLUDING THE SAME AND METHOD OF OPERATING THE MEMORY SYSTEM

(71) Applicant: SAMSUNG ELECTRONICS CO., LTD., Suwon-si, Gyeonggi-Do (KR)

(72) Inventors: Su Yeon Doo, Seoul (KR); Tae Young Oh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 416 days.

(21) Appl. No.: 14/976,865

(22) Filed: Dec. 21, 2015

(65) Prior Publication Data

US 2016/0292111 A1 Oct. 6, 2016

(30) Foreign Application Priority Data

Mar. 30, 2015 (KR) .................. 10-2015-0044626
Jul. 30, 2015 (KR) .................. 10-2015-0108351

(51) Int. Cl.
G06F 13/36 (2006.01)
G06F 13/16 (2006.01)
G06F 13/40 (2006.01)
G06F 13/362 (2006.01)

(52) U.S. Cl.
CPC ...... *G06F 13/3625* (2013.01); *G06F 13/1689* (2013.01); *G06F 13/4068* (2013.01)

(58) Field of Classification Search
CPC ............. G06F 13/3625; G06F 13/1689; G06F 13/4068

USPC .......................................................... 710/110
See application file for complete search history.

(56) References Cited

U.S. PATENT DOCUMENTS

| | | | |
|---|---|---|---|
| 5,229,970 A | 7/1993 | Lee et al. | |
| 7,010,642 B2 | 3/2006 | Perego et al. | |
| 7,428,644 B2 | 9/2008 | Jeddeloh et al. | |
| 8,296,540 B2 | 10/2012 | Garlepp et al. | |
| 8,724,415 B2 | 5/2014 | Kuroda | |
| 8,917,110 B2* | 12/2014 | Ko | G11C 7/1057 326/30 |
| 8,971,108 B2* | 3/2015 | Park | G11C 5/02 365/174 |

(Continued)

FOREIGN PATENT DOCUMENTS

| | | |
|---|---|---|
| KR | 1020070048337 | 5/2007 |
| KR | 1020080017107 | 2/2008 |

(Continued)

*Primary Examiner* — Christopher B Shin
(74) *Attorney, Agent, or Firm* — F. Chau & Associates, LLC

(57) ABSTRACT

A method of operating a memory controller, memory devices including a master memory device and slave memory devices, a back channel bus coupling the master memory device to the slave memory devices and a channel coupling the memory controller to the memory devices is provided as follows. A memory command is received by the memory devices from the memory controller. An internal command is generated and outputted by the master memory device. The internal command is received by the slave memory devices. The internal command is transmitted to the slave memory devices through the back channel bus.

21 Claims, 21 Drawing Sheets

(56) References Cited

U.S. PATENT DOCUMENTS

| | | | |
|---|---|---|---|
| 9,471,529 B2* | 10/2016 | Lee | G06F 13/4252 |
| 9,928,205 B2* | 3/2018 | Kim | G06F 13/4247 |
| 2009/0113158 A1* | 4/2009 | Schnell | G06F 1/10 |
| | | | 711/167 |
| 2010/0152747 A1* | 6/2010 | Padiy | A61N 1/0534 |
| | | | 606/129 |
| 2014/0059287 A1 | 2/2014 | Bains et al. | |
| 2014/0237177 A1* | 8/2014 | Yu | G11C 11/40607 |
| | | | 711/106 |
| 2014/0281174 A1* | 9/2014 | Lee, II | G06F 11/1458 |
| | | | 711/103 |
| 2014/0355370 A1* | 12/2014 | Kim | G11C 11/40615 |
| | | | 365/222 |
| 2014/0369109 A1* | 12/2014 | Lee | G11C 11/406 |
| | | | 365/149 |
| 2016/0086650 A1* | 3/2016 | Kim | G11C 11/406 |
| | | | 365/222 |

FOREIGN PATENT DOCUMENTS

| | | |
|---|---|---|
| KR | 1020090085056 | 8/2009 |
| KR | 1020100028684 | 3/2010 |
| KR | 1020120046871 | 5/2012 |
| KR | 1020140103460 | 8/2014 |
| WO | 2006089313 | 8/2006 |

* cited by examiner

SEMICONDUCTOR MEMORY DEVICE FOR SHARING INTER-MEMORY COMMAND AND INFORMATION, MEMORY SYSTEM INCLUDING THE SAME AND METHOD OF OPERATING THE MEMORY SYSTEM

CROSS-REFERENCE TO RELATED APPLICATION

This application claims priority under 35 U.S.C. § 119(a) to Korean Patent Application Nos. 10-2015-0044626 filed on Mar. 30, 2015 and 10-2015-0108351 filed on Jul. 30, 2015 in the Korean Intellectual Property Office, the disclosure of which is incorporated by reference herein in their entirety.

TECHNICAL FIELD

The present inventive concept relates to a semiconductor memory device for sharing inter-memory command and information, a memory system including the same and a method of operating the memory system.

DISCUSSION OF RELATED ART

A semiconductor memory device includes a non-volatile memory device and a volatile memory device. To increase memory capacity or bandwidth, two or more memories are collectively used in a module, for example. The memories are coupled through a data channel and a command/address channel to a memory controller. Each memory communicates to the memory controller through the data channel and the command channel.

SUMMARY

According to an exemplary embodiment of the present inventive concept, a method of operating a memory controller, memory devices including a master memory device and slave memory devices, a back channel bus coupling the master memory device to the slave memory devices and a channel coupling the memory controller to the memory devices is provided as follows. A memory command is received by the memory devices from the memory controller. An internal command is generated and outputted by the master memory device. The internal command is received by the slave memory devices. The internal command is transmitted to the slave memory devices through the back channel bus.

According to an exemplary embodiment of the present inventive concept, a method of operating memory devices including a master memory device and slave memory devices and a back channel bus coupling the master memory device to the slave memory devices is provided as follows. First device information is generated by the master memory device. Second device information is generated by the slave memory devices. At least one of the first device information and the second device information is selected and outputted to a memory controller by the master memory device.

According to an exemplary embodiment of the present inventive concept, a method of operating memory devices including a master memory device and slave memory devices and a back channel bus coupling the master memory device to the slave memory devices is provided as follows. Device information is generated by each of the master memory device and the slave memory devices. At least one of the device information is selected by the master memory device. An internal command is generated by the master memory device based on the at least one of the device information. The internal command is performed at substantially the same time on the master memory device and the slave memory devices.

According to an exemplary embodiment of the present inventive concept, a memory module includes a master memory device, slave memory devices, a first command channel and a second command channel. The first command channel is shared by the master memory device and the slave memory devices. The master device and the slave memory devices receive a first command from a memory controller through the first command channel. The second channel electrically couples the master memory device to the slave memory devices. The slave memory devices receive a second command generated and outputted from the master memory device. The master memory device and the slave memory devices perform the second command at substantially the same time.

According to an exemplary embodiment of the present inventive concept, a semiconductor memory device includes a memory core, a command decoder, a back channel command interface and a control logic. The memory core includes memory banks to store data. The command decoder interprets a command received from a memory controller. The control logic is coupled to the command decoder and the back channel command interface. The control logic performs the interpreted command, generates and outputs externally a back channel command if the semiconductor memory device is set to a master memory device or performs a back channel command received from the back channel command interface if the semiconductor memory device is set to a slave memory device. The back channel command is outputted externally through the back channel command interface.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF EXEMPLARY EMBODIMENTS

Figure 1:
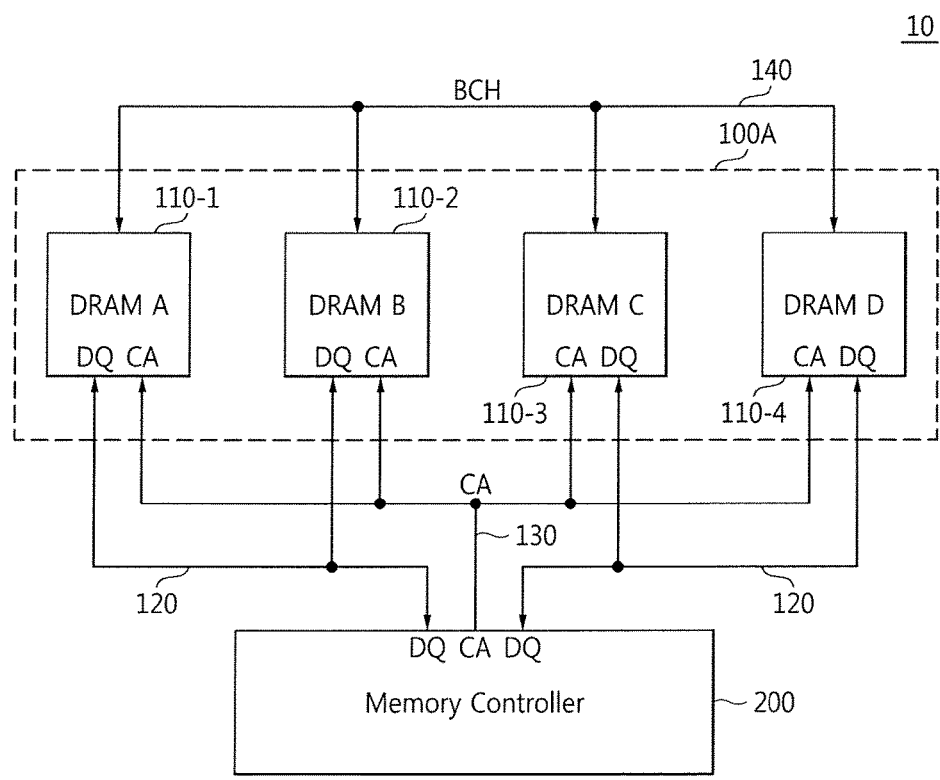
FIG. 1 is a schematic diagram of a memory system according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a schematic diagram of a memory system 10 according to an exemplary embodiment of the present inventive concept. The memory system 10 includes a memory module 100A and a memory controller 200. The memory module 100A includes a plurality of semiconductor memory devices 110-1 through 110-4. The memory module 100A may be embodied as a single in-line memory module (SIMM) or a dual in-line memory module (DIMM), but the present inventive concept is not limited thereto. For the convenience of description, each of memory modules 100A through 100C of FIGS. 1 to 8 includes four memory devices 110-1 through 110-4. The number of memory devices of a memory module according to the present inventive concept may be changed.

The memory system 10 also includes a data bus 120 between the memory controller 200 and the memory devices 110-1 through 110-4 and a command bus 130 (hereinafter, referred to as an external command bus) between the memory controller 200 and the memory devices 110-1 through 110-4.

Each of the memory devices 110-1 through 110-4 may be dynamic random access memory (DRAM). The memory devices 110-1 through 110-4 may receive command/address (CA) information from the memory controller 200 through the external command bus 130. The CA information may include an external command ECMD and address information ADD. The external command bus 130 may be a unidirectional bus which transmits the address information ADD and the external command ECMD from the memory controller 200 to the memory devices 110-1 through 110-4.

The data bus 120 may be a bidirectional bus. For example, the memory devices 110-1 through 110-4 transmit and receive a data signal DQ and a data strobe signal DQS to and from the memory controller 200 through the data bus 120.

The data bus 120 and the external command bus 130 are used for the communication between the memory controller 200 and the memory devices 110-1 through 110-4. The data bus 120 and the external command bus 130 are not used for communication between the memory devices 110-1 through 110-4.

The memory controller 200 may control the memory module 100A to perform a read operation and/or a write operation. The memory controller 200 may be implemented as a single chip. In an exemplary embodiment, the memory controller 200 may be packaged with a logic chip such as an application processor. In an exemplary embodiment, the memory controller 200 may be integrally fabricated as part of an application processor or a system on chip (SoC).

The memory devices 110-1 through 110-4 may communicate with each other using an inter-memory bus, which may be referred to as a back channel bus BCH or 140. For instance, at least one of the memory devices 110-1 through 110-4 may transmit an internal command and/or device information to other memory devices through the back channel bus BCH. If the leftmost memory device 110-1 is set to a master memory device, the master memory device 110-1 generates an internal command, outputting the internal command to other memory devices 110-2 through 110-4 using the back channel bus BCH. In this case, the other memory devices 110-2 through 110-4 are set to slave memory devices.

Each memory device may generate device information. If a memory device 110-1 is set to a master memory device and if other memory devices 110-2 through 110-4 are set to slave memory devices, the device information of the slave memory devices are outputted to the master memory device 110-1 using the back channel bus 140. For example, the device information may include a device temperature or bank information indicating to a bank which is most frequently accessed for a predetermined time.

In an exemplary embodiment, the back channel bus 140 is provided separately from the buses 120 and 130 which are disposed between the memory controller 200 and the memory devices 110-1 through 110-4. Alternatively, the buses 120 and 130 may serve as a back channel bus. The back channel bus 140 may include a back channel command bus which transfers an inter-memory command (hereinafter, referred to as a "back channel command") and a back channel data bus which transfers inter-memory data (hereinafter, referred to as "back channel data"). The back channel command bus and the back channel data bus may be separately implemented or may be integrated into a single bus. The back channel bus 140 may also include a back channel clock bus which transfers an inter-memory clock signal (hereinafter, referred to as a "back channel clock signal"). The connection method and the structure of the back channel bus 140 may vary and will be described in detail with reference to FIGS. 2 through 7 later.

Figure 2:
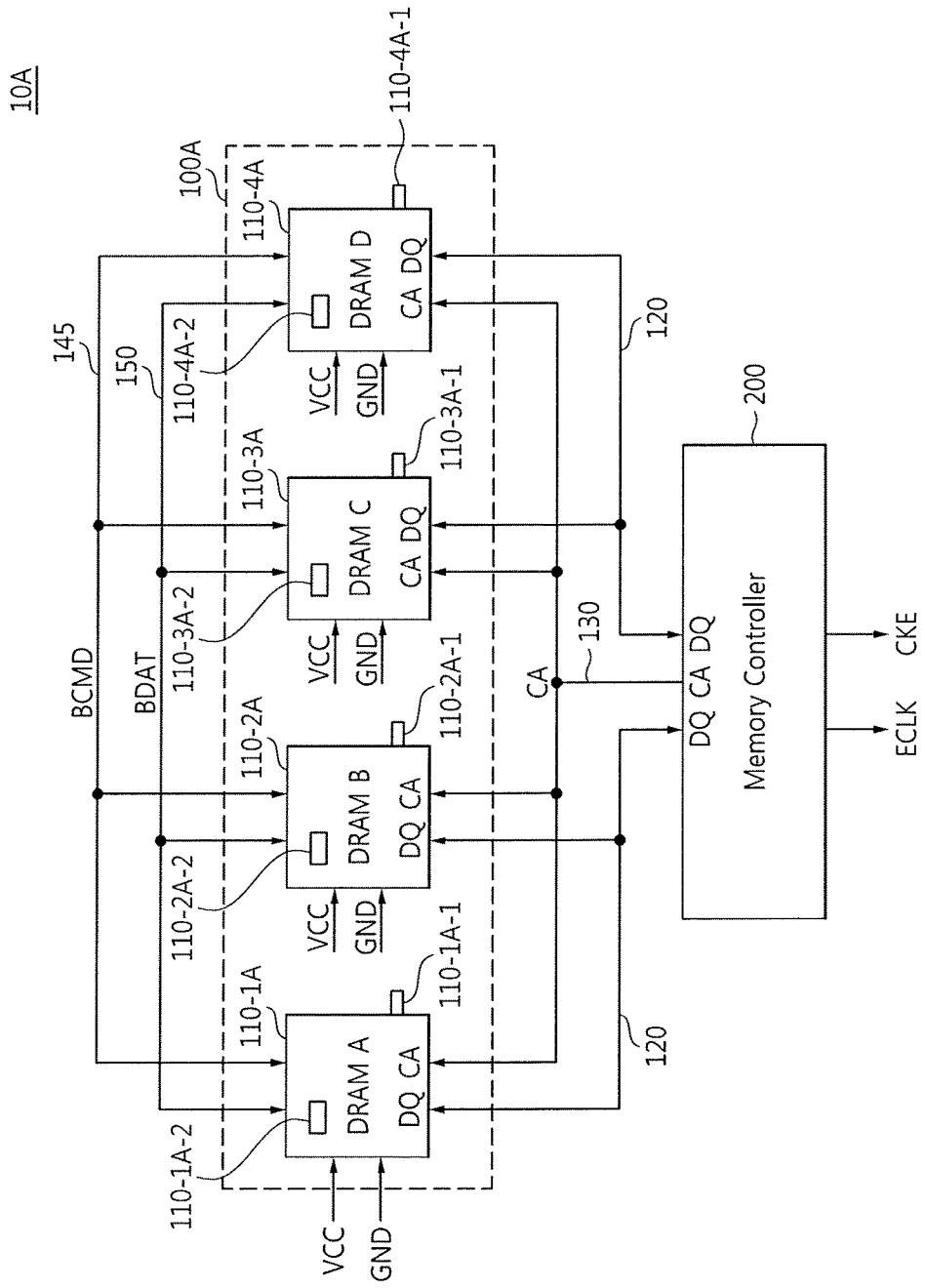
FIG. 2 is a schematic diagram of a memory system according to other embodiments of the inventive concept.

FIG. 2 is a schematic diagram of a memory system 10A according to an exemplary embodiment of the present inventive concept. The structure and operations of the memory system 10A of FIG. 2 are similar to those of the memory system 10 of FIG. 1, and therefore, description will be focused on differences from the memory system 10.

The memory system 10A includes a back channel command bus 145 and a back channel data bus 150 through which memory devices 110-1A through 110-4A communicate to each other. In addition to the back channel command bus 145 and the back channel data bus 150, the memory system 10A also includes an external command bus 130 and a data bus 120 connected between a memory controller 200 and the memory devices 110-1A through 110-4A. The back channel command bus 140 and the back channel data bus 150 are exclusively used for communication among memory devices 110-1A through 110-4A. The external command bus 130 and the data bus 120 are exclusively used for communication between the memory controller 200 and the memory devices 110-1A through 110-4A.

The back channel command bus 145 are connected so that two memory devices (e.g., 110-1A and 110-2A) among the memory devices 110-1A through 110-4A may directly communicate with each other. For example, if a memory device 110-1A is set to as a master memory device, the master memory device 110-1A may broadcast using the back channel command bus 145 a back channel command BCMD to the other memory devices 110-2A through 110-4A. In this case, the other memory devices 110-2A through 110-4B are set to as slave memory devices. The leftmost memory device 110-1A is set to as a master memory device which generates and outputs a back channel command BCMD, and the other memory devices are set to as slave memory devices which receive and perform the back channel command BCMD. The present inventive concept is not limited thereto. Any memory device among the memory devices 110-1A through 110-4A may be set to as a master memory device, and the other memory devices may be set to as slave memory devices.

For the convenience of description, it is assumed hereinafter that the first memory device 110-1A is a master memory device and the second through fourth memory devices 110-2A through 110-4A are slave memory devices.

The master memory device 110-1A may generate a back channel command BCMD and send the back channel command BCMD to the slave memory devices 110-2A through 110-4A. The slave memory devices 110-2A through 110-4A receive and perform the back channel command BCMD. For example, the master memory device 110-A1 and the slave memory devices 110-2A through 110-4A may operate in response to the back channel command BCMD. In an exemplary embodiment, the master memory device 110-A1 and the slave memory devices 110-2A through 110-4A may perform the back channel command BCMD at substantially the same time. In an exemplary embodiment, the slave memory devices 110-2A through 110-4A may send an acknowledgement ACK of the back channel command BCMD to the master memory device 110-1A through the back channel command bus 145. The acknowledgement ACK includes information indicating that the back channel command BCMD has been completed or information (e.g., error or fail information) indicating that it has not been able to complete the back channel command BCMD.

A slave memory device may also transmit to a master memory device its own device information through the back channel data bus 150. The device information may be referred to as a back channel data BDAT. For example, the back channel data BDAT may include data stored in the slave memory devices 110-2A through 110-4A, or internally detected information by the slave memory devices 110-2A through 110-4A. In an exemplary embodiment, the back channel data BDAT may include temperature information or bank information indicating to a bank which is most frequently accessed within a predetermined time.

A master memory device and a slave memory device may have the same form factor and internal circuit configuration. For example, the memory devices 110-1 through 110-4 may be the same memory device. In this case, at least one of the memory devices 110-1A through 110-4A may be set to as a master memory device and the others may be set to as slave memory devices by a manufacturer or a user in various manners. For instance, the first memory device 110-1A may be set to as a master memory device by connecting a pin 110-1A-1 to a power supply voltage VCC and the second through fourth memory devices 110-2A through 110-4A may be set to as slave memory devices by connecting the pins 110-2A-1 through 110-4A-1 of the slave memory devices 110-2A through 110-4A to a ground voltage GND. Alternatively, whether a memory device is a master memory device or a slave memory device is set by programming mode registers 110-1A-2 through 110-4A-2 to predetermined values. In this case, the mode register 110-1A-2 of the master memory device 110-1A is set to as a first value, and the modes registers 110-2A-2 through 110-4A-2 of the slave memory devices 110-2A through 110-4A are set to a second value.

Alternatively, the memory devices 110-1A through 110-4A are not set to as either a master memory device or a slave memory device. For example, each of the memory devices 110-1A through 110-4A may transmit the back channel command BCMD and/or the back channel data BDAT to other memory devices when necessary or in response to a request.

Alternatively, a master memory device may be different from a slave memory device.

Figure 3:
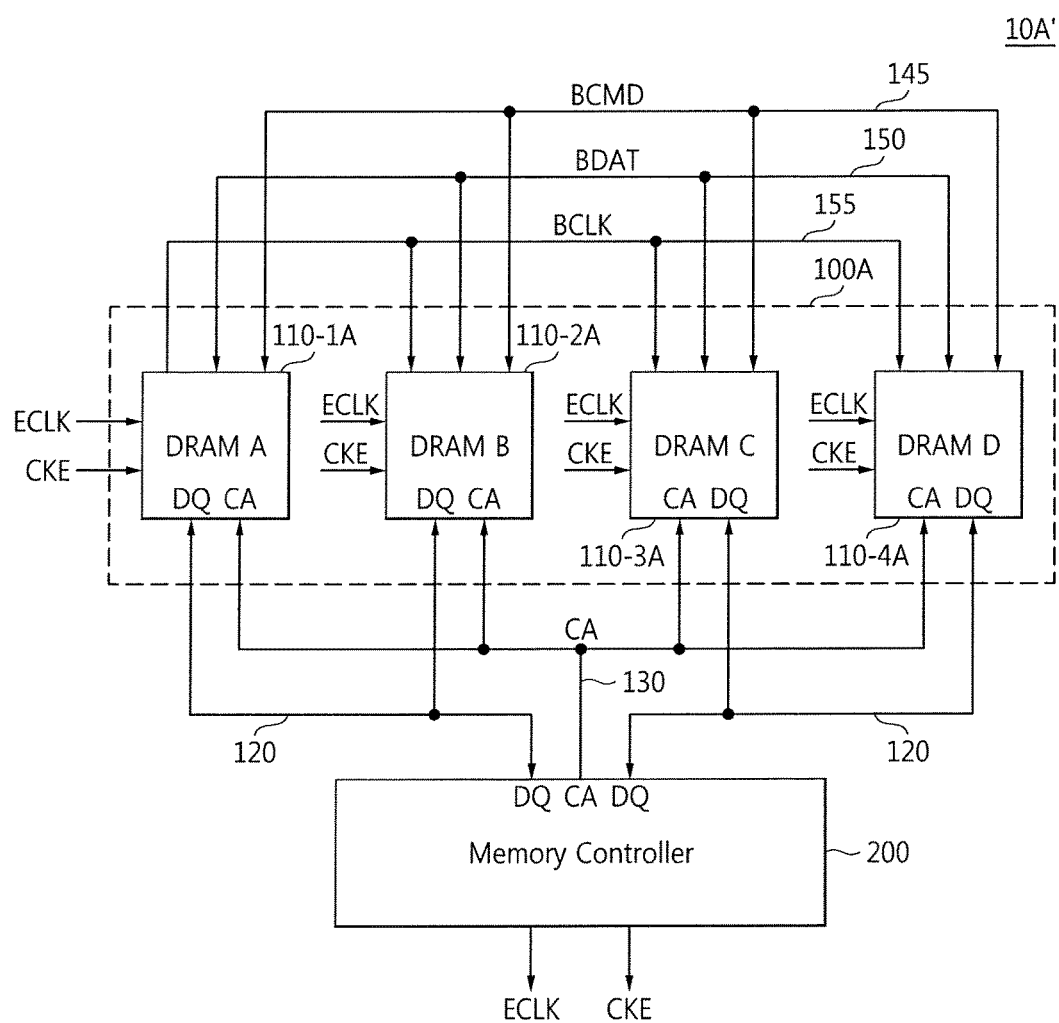
FIG. 3 is a schematic diagram of a modified example of the memory system of FIG. 2.

FIG. 3 is a schematic diagram of a memory system according to an exemplary embodiment of the present inventive concept. The structure and operations of the memory system 10A' of FIG. 3 are similar to those of the memory system 10A of FIG. 2, and therefore, description will be focused on differences from the memory system 10A.

The memory system 10A' includes a back channel command bus 145, a back channel data bus 150 and a back channel clock bus 155. Compared to the memory system 10A of FIG. 2, the memory system 10A' of FIG. 3 further includes the back channel clock bus 155. A back channel clock signal BCLK may be distributed among the memory devices 110-1A through 110-4A through the back channel clock bus 155. For example, the master memory device 110-1A may generate and distribute the back channel clock signal BCLK to the slave memory devices 110-2A through 110-4A using the back channel clock bus 155.

The memory devices 110-1A through 110-4A receive an external clock signal ECLK from the memory controller 200. The memory controller 200 may apply an external command ECMD to the memory devices 110-1A through 110-4A in synchronization with the external clock signal ECLK, and the memory devices 110-1A through 110-4A may receive the external command ECMD with reference to the external clock signal ECLK.

Apart from the external clock signal ECLK transmitted from the memory controller 200 to the memory devices 110-1A through 110-4A, the back channel clock signal BCLK may be used to synchronize the back channel command BCMD and/or the back channel data BDAT among the memory devices 110-1A through 110-4A.

The master memory device 110-1A may generate the back channel clock signal BCLK and send the back channel clock signal BCLK to the slave memory devices 110-2A through 110-4A using the back channel clock bus 155. The back channel clock signal BCLK will be described in detail with reference to FIGS. 13 and 14 later.

Whether each memory device is a master memory device or a slave memory device may be set using a pin connection or a mode register as described with reference to FIG. 2. For the simplicity of drawing, the pins 110-1A-1 through 110-4A-1 and the mode registers 110-1A-2 through 110-4A-2 of FIG. 2 are omitted.

Figure 4:
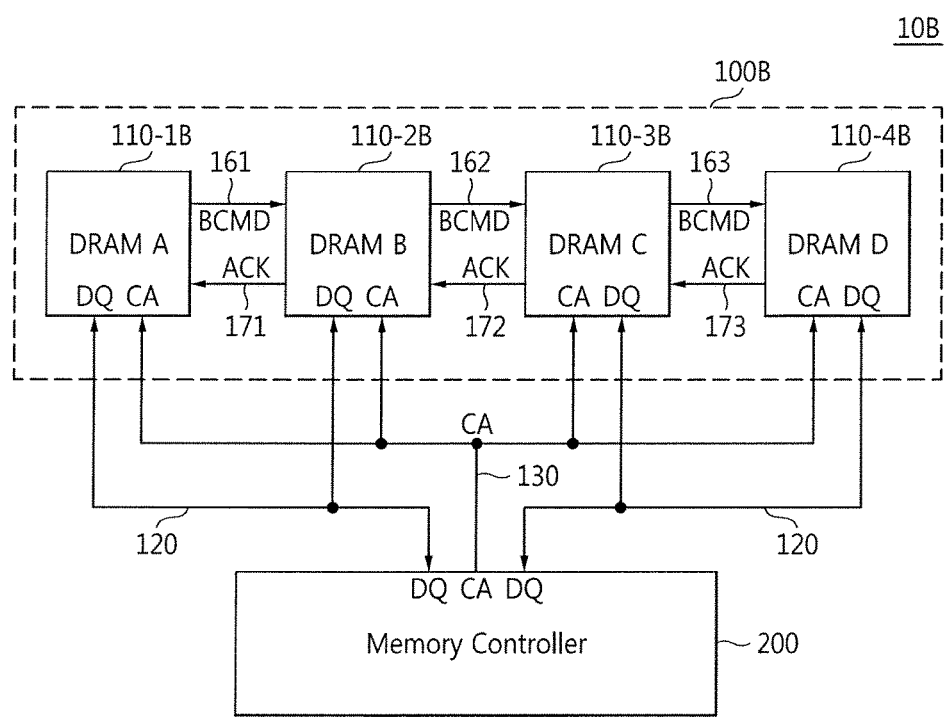
FIG. 4 is a schematic diagram of a memory system according to still other embodiments of the inventive concept.

FIG. 4 is a schematic diagram of a memory system 10B according to an exemplary embodiment of the present inventive concept. The structure and operations of the memory system 10B of FIG. 4 are similar to those of the memory system 10A of FIG. 2, and therefore, description will be focused on differences from the memory system 10A. For the convenience of description, it is assumed that a first memory device 110-1B is a master memory device and the other memory devices 110-2B through 110-4B are slave memory devices.

The memory system 10B includes a back channel bus including inter-memory buses 161 through 163 and 171 through 173 between two memory devices for communicating a back channel command and acknowledgment ACK among memory devices 110-1B through 110-4B. The back channel bus is an exclusive bus for communication between two memory devices.

The memory system 10B of FIG. 4 includes separate inter-memory buses 161 through 163 and 171 through 173, in addition to the data bus 120 and the external command bus 130. The inter-memory buses 161 through 163 and 171 through 173 are exclusive buses for communication among the memory devices 110-1B through 110-4B.

The inter-memory buses 145 and 150 of FIG. 2 have a structure allowing any two memory devices (e.g., the first and second memory devices 110-1A and 110-2A) among the memory devices 110-1A through 110-4A to directly communicate with each other, but the inter-memory buses 161 through 163 and 171 through 173 of FIG. 4 have a structure connecting the memory devices 110-1B through 110-4B in chain form.

For example, the inter-memory buses 161 and 171 may directly connect the first and second memory devices 110-1B and 110-2B with each other. The inter-memory buses 162 and 172 may directly connect the second and third memory devices 110-2B and 110-3B with each other. The inter-memory buses 163 and 173 may directly connect the third and fourth memory devices 110-3B and 110-4B with each other.

If the inter-memory buses 161 through 163 and 171 through 173 are structured in chain form, communication between the first and third memory devices 110-1B and 110-3B may be conducted through the second memory device 110-2B and communication between the first and fourth memory devices 110-1B and 110-4B may be conducted through the second and third memory devices 110-2B and 110-3B. The inter-memory buses 161 through 163 may be connected to each other by the memory devices 110-1B through 110-4B to transfer the back channel command BCMD. Similarly, the inter-memory buses 171 through 173 may be connected to each other by the memory devices 110-1B through 110-4B to transfer the back channel data BDAT.

When a master memory device 110-1B sends the back channel command BCMD to a slave memory device 110-4B, the back channel command BCMD may be transmitted to the fourth memory device 110-4B via the second and third memory devices 110-2B and 110-3B. The slave memory device 110-4B may send the acknowledgement ACK of the back channel command BCMD to the master memory device 110-1B through the third and second memory devices 110-3B and 110-2B. The acknowledgement ACK may be transmitted to the master memory device 110-1B in an opposite direction to the transmission path of the back channel command BCMD.

Whether each memory device is a master memory device or a slave memory device may be set using a pin connection or a mode register as described with reference to FIG. 2, for example. For the simplicity of drawing, the pins 110-1A-1 through 110-4A-1 and the mode registers 110-1A-2 through 110-4A-2 of FIG. 2 are omitted.

Figure 5:
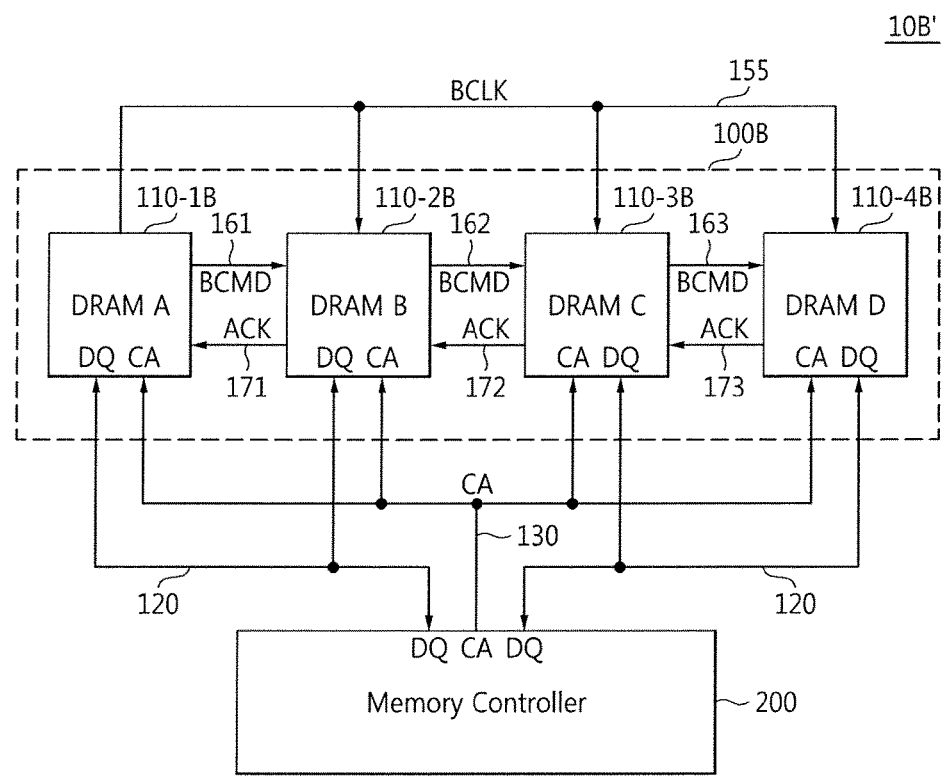
FIG. 5 is a schematic diagram of a modified example of the memory system of FIG. 4.

FIG. 5 is a schematic diagram of a memory system 10B' according to an exemplary embodiment of the present inventive concept. The structure and operations of the memory system 10B' of FIG. 5 are similar to those of the memory system 10B of FIG. 4, and therefore, description will be focused on differences from the memory system 10B.

The memory system 10B' of FIG. 5 further includes a back channel clock bus 155 as compared to the memory system 10B of FIG. 4. A back channel clock signal BCLK is distributed among the memory devices 110-1B through 110-4B by back channel clock bus 155. Like the back channel clock bus 155 of FIG. 3, the back channel clock bus 155 of FIG. 5 may have a structure which directly connect the memory devices 110-1B through 110-4B with each other. However, the back channel clock bus 155 may have a structure connecting the memory devices 110-1B through 110-4B in chain form, like the back channel command buses 161 through 163 of FIG. 4.

In this case, the first memory device 110-1B is a master memory device and the other memory devices 110-2B through 110-4B are slave memory devices. Whether each memory device is a master memory device or a slave memory device may be set using a pin connection or a mode register as described with reference to FIG. 2, for example. For the simplicity of drawing, the pins 110-1A-1 through 110-4A-1 and the mode registers 110-1A-2 through 110-4A-2 of FIG. 2 are omitted.

Figure 6:
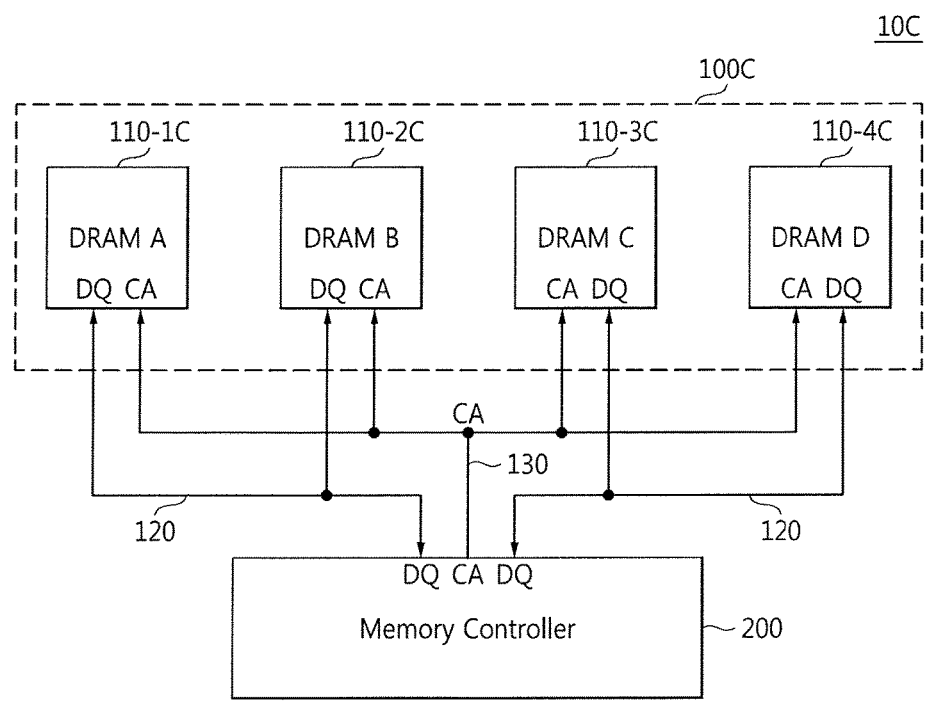
FIG. 6 is a schematic diagram of a memory system according to even other embodiments of the inventive concept.

FIG. 6 is a schematic diagram of a memory system 10C according to an exemplary embodiment of the present inventive concept. The structure and operations of the memory system 10C of FIG. 6 are similar to those of the memory system 10A of FIG. 2, and therefore, description will be focused on differences from the memory system 10A. For the convenience of description, a first memory device 110-1C is set to a master memory device and other memory devices 110-2C through 110-4C are set to slave memory devices.

The memory system 10C of FIG. 6 allows the memory devices 110-1C through 110-4C to communicate with each other using an external command bus 130. For example, the memory system 10C does not include an exclusive back channel bus for communication among memory devices 110-1C through 110-4C. Instead, the memory system 10C may use the external command bus 130 for the communication among the memory devices during a period when a memory controller 200 does not access the memory devices 110-1C through 110-4C.

The external command bus 130 is used both for communication among the memory devices 110-1C through 110-4C and for communication between the memory controller 200 and the memory devices 110-1C through 110-4C. Accordingly, the external command bus 130 may be used as the inter-memory bus 140 of FIG. 1 during the whole or part of the period when the memory controller 200 does not access the memory controller 200 through the external command bus 130.

The master memory device 110-1C may send a back channel command BCMD to the slave memory devices 110-2C through 110-4C using the external command bus 130 during a period when the memory controller 200 does not use the external command bus 130 to control the memory devices 110-1C through 110-4C. The slave memory devices 110-2C through 110-4C may operate in response to the back channel command BCMD and may send an acknowledgement ACK of the back channel command BCMD to the master memory device 110-1C using the external command bus 130 during a period when the memory controller 200 does not use the external command bus 130. In an exemplary embodiment, the acknowledgement ACK may be generated after completion of the back channel command BCMD received from the master memory device 110-1C.

A slave memory device may transmit its own device information to a master memory device using the external command bus 130 during a period when the memory controller 200 does not use the external command bus 130. For example, the device information may include data stored in each memory device or internally detected information of each memory device. In this case, the internally detected information may include temperature information or bank information indicating to a bank which is most frequently accessed within a predetermined time.

Figure 7:
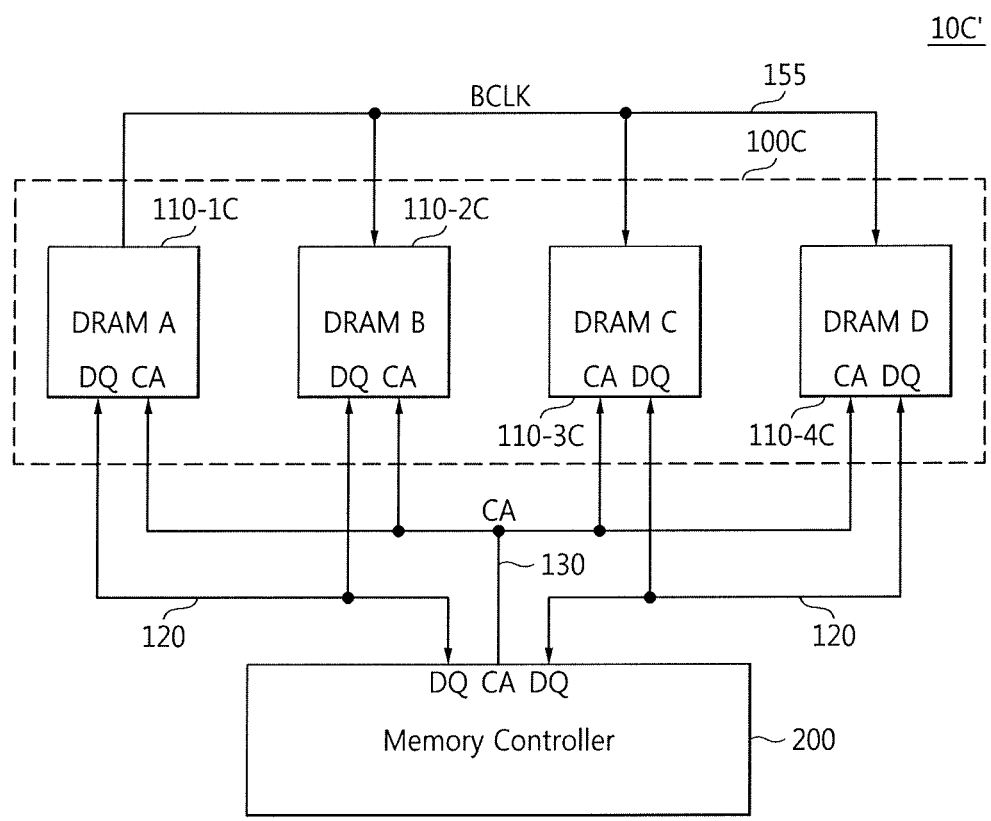
FIG. 7 is a schematic diagram of a modified example of the memory system of FIG. 6.

FIG. 7 is a schematic diagram of a memory system according to an exemplary embodiment of the present inventive concept. The structure and operations of the memory system 10C' of FIG. 7 are similar to those of the memory system 10C of FIG. 6, and therefore, description will be focused on differences from the memory system 10C. Similarly to the memory system 10A' of FIG. 3 or the memory system 10B' of FIG. 5, the memory system 10C' of FIG. 7 further includes a back channel clock bus 155 as compared to the memory system 10C of FIG. 6.

Figure 8:
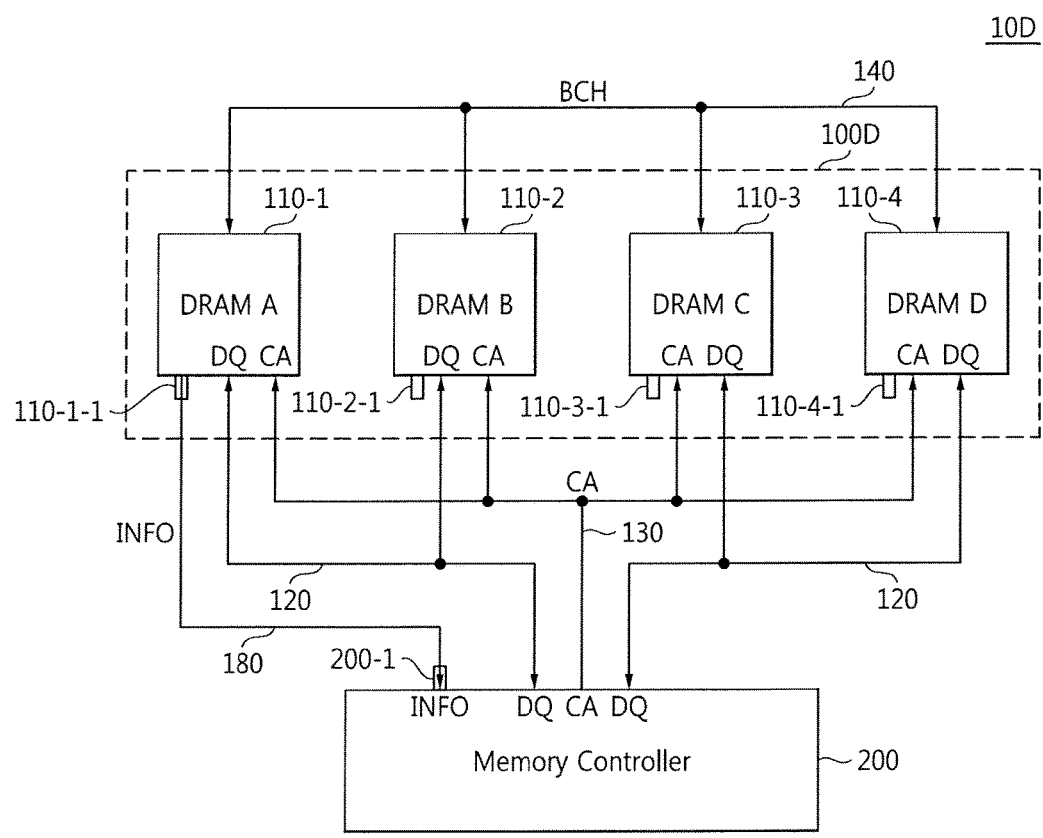
FIG. 8 is a schematic diagram of a memory system according to yet other embodiments of the inventive concept.

FIG. 8 is a schematic diagram of a memory system 10D according to an exemplary embodiment of the present inventive concept. The structure and operations of the memory system 10D of FIG. 8 are similar to those of the memory system 10 of FIG. 1, and therefore, description will be focused on differences from the memory system 10. For the convenience of description, a first memory device 110-1 is set to a master memory device and the other memory devices 110-2 through 110-4 are set to slave memory devices. Whether each memory device is the master memory device or the slave memory device may be set using a pin connection or a mode register as described with reference to FIG. 2, for example. For the simplicity of drawing, the pins 110-1A-1 through 110-4A-1 and the mode registers 110-1A-2 through 110-4A-2 of FIG. 2 are omitted.

As compared to the memory system 10 of FIG. 1, the memory system 10D further includes an information signal line 180 which connects at least one memory device (e.g., the first memory device 110-1) among the memory devices 110-1 through 110-4 to the memory controller 200. The information signal line 180 is a signal line through which a back channel data INFO is outputted from the master memory device 110-1 to a memory controller 200. In an exemplary embodiment, the master memory device 110-1 may generate its own back channel data and receives back channel data BDAT outputted from the slave memory devices 110-2 through 110-4, and selects the back channel data INFO to be outputted to the controller 200. In an exemplary embodiment, the master memory device 110-1 may generate its own back channel data and receive the back channel data BDAT outputted from the slave memory devices 110-2 through 110-4, and outputs at least one of the back channel data generated from the master memory device and the slave memory devices as the back channel data INFO to the controller 200.

In an exemplary embodiment, the device information may be temperature information. For example, the memory devices 110-1 through 110-4 each may detect temperature information of its own using an internal temperature sensor. The slave memory devices 110-2 through 110-4 may output the temperature information to the master memory device 110-1 through a back channel bus 140. The master memory device 110-1 may receive the temperature information from each of the slave memory devices 110-2 through 110-4 and may output the temperature information indicating the highest temperature to the memory controller 200 through the information signal line 180.

In this case, the memory controller 200 may adjust timing parameters defined for a read operation or a write operation based on the highest temperature INFO received from the master memory device 110-1.

In an exemplary embodiment, the device information may be row address information indicating to a row address in a predetermined bank which is most frequently accessed within a predetermined time. Each memory device may generate the row address information, and the slave memory devices 110-2 through 110-4 may output the bank information to the master memory device 110-1. In this case, the master memory device 110-1 may share the row address information with the slave memory devices 110-2 through 110-4. In this case, the memory devices 110-1 through 110-4 may perform without intervention of a memory controller a row hammer operation to prevent memory cells from losing their data due to excessive continuous access to the memory cells.

In an exemplary embodiment, the row address information collected by the master memory device 110-1 may be sent to the memory controller 200 as the back channel data INFO using the information signal line 180.

As described above, each of the first through fourth memory devices 110-1 through 110-4 may share its own device information with the other memory devices. In an exemplary embodiment, device information collected by the master memory device 110-1 may be shared with the slave memory devices. In an exemplary embodiment, device information collected by the master memory device 110-1 may be sent to the memory controller 200 through the information signal line 180.

A pin 110-1-1 of the master memory device 110-1 is electrically connected through the information signal line 180 to a pin 200-1 of the memory controller 200. In an exemplary embodiment where the memory devices 110-1 through 110-4 have the same form factor, the slave memory devices 110-2 through 110-4 may include pins 110-2-1 through 110-4-1 corresponding to the pin 110-1-1 of the master memory device 110-1. However, the pins 110-2-1 through 110-4-1 are not connected to the memory controller 200.

Figure 9:
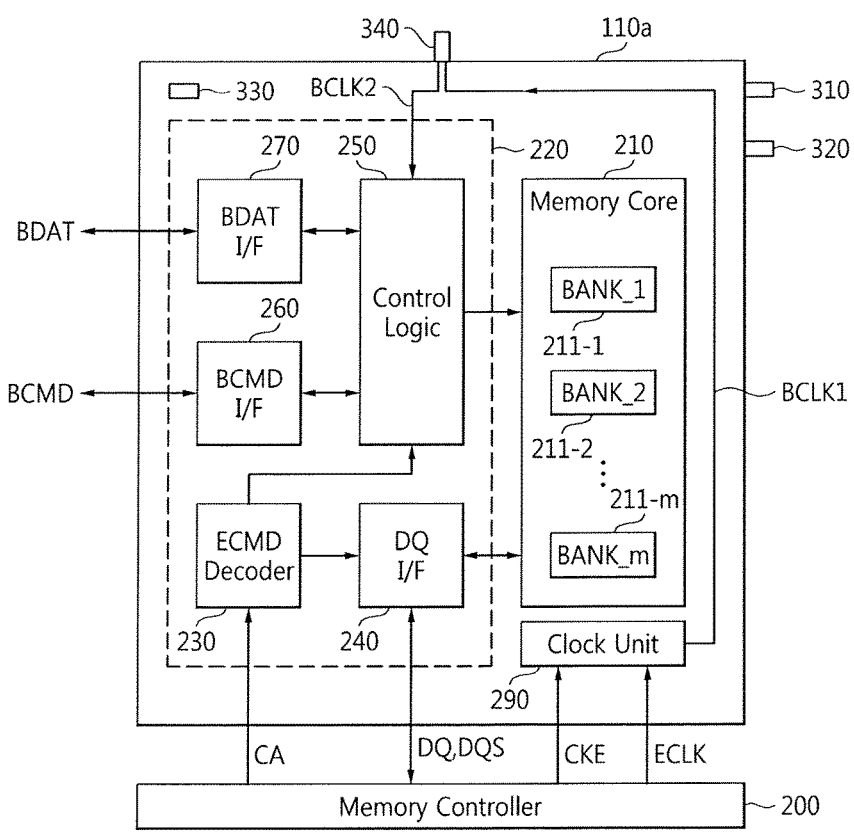
FIG. 9 is a diagram of a memory device in the memory systems of FIGS. 1 through 8 according to an exemplary embodiment of the inventive concept.

FIG. 9 shows a block diagram of a memory device 110a according to an exemplary embodiment of the present inventive concept. The memory device 110 may be included in the memory systems 10 and 10A through 10D of FIGS. 1 through 8. Referring to FIGS. 1 through 9, the memory device 110a includes a memory core 210, an access circuit 220, and a clock unit 290. The memory device 110a also includes a first pin 310 and a second pin 320. The first pin 310 may serve to set the memory device 110a to a master device or a slave memory device of a memory system according to an exemplary embodiment of FIG. 2. The second pin 320 may serve to output device information to a memory controller in a memory system according to an exemplary embodiment of FIG. 8. The pins 110-1-1 through 110-4-1 of FIG. 8 may correspond to the second pin 320. In an exemplary embodiment, the memory device 110a may include at least one of the pins 310 and 320. In an exemplary embodiment, the memory device 110a may operate without having the pins 310 and 320.

The memory device 110a includes a mode register 330 to set the memory device 110a to a master memory device or a slave memory device. If the mode register 330 is used to set the memory device 110a to a master memory device or a slave memory device, the first pin 310 may be eliminated from the memory device 110a.

The memory core 210 includes one or more bank units 211-1 through 211-m, where "m" is an integer number of at least 1. For the convenience of description, it is assumed that "m" is 4. Since the bank units 211-1 through 211-m operate substantially in the same manner, only the first bank unit 211-1 will be described here.

Although not shown, the first bank unit 211-1 may include a memory cell array, a row decoder, and a bank control logic. The memory cell array may include a plurality of memory cells arranged in a matrix form. The memory cells may store data of at least one bit. The memory cells may be formed of volatile memory which stores data while powered on and may be refreshed to prevent data loss.

The memory cell may be divided into a plurality of blocks (not shown). For instance, the memory cell array of the first bank unit 211-1 may include 16 blocks, for example. Each of the blocks may independently perform a read operation, a write operation, or a refresh operation. The refresh operation may be performed using a refresh command which is generated internally by the master memory device 110-1A, which is different from a refresh command supplied externally by a memory controller. The refresh command internally generated by the master memory device may be referred to as a per-bank self refresh command.

The access circuit 220 includes an external command decoder 230, an external data interface (DQ I/F) 240, a control logic 250, a back channel command interface (BCMD I/F) 260 and a back channel data interface (BDAT I/F) 270. The control logic 250 is connected to the external command decoder 230 and the back channel command interface 260. The access circuit 220 controls the memory core 210 according to the external command/address CA information received from the memory controller 200. The external CA information may include an external command ECMD and address information ADD. The access circuit 220 may also control the memory core 210 according to the back channel command BCMD outputted from the BCMD I/F 260.

The external command decoder 230 may sample the external command/address CA received from the memory controller 200, interpret the external command ECMD, and transmit an interpretation result to the control logic 250. The external command ECMD is information by which the memory controller 200 requests the memory device 110a to perform an operation. The external command ECMD may be a read command, a write command, an activation command, a precharge command or a refresh command. The address ADD may include information about bank, row and column addresses of a memory cell, i.e., on which the external command ECMD is performed.

The DQ I/F 240 transmits the data DQ from the memory controller 200 to the memory core 210 and transmits the data DQ from the memory core 210 to the memory controller 200.

The BCMD I/F 260 transmits the back channel command BCMD to other memory devices and may receive the back channel command BCMD from other memory devices. For example, if the memory device 110a is a slave memory device, the back channel command I/F 260 may receive the back channel command BCMD from a master memory device, may interpret the back channel command BCMD, and may transmit the interpretation result to the control logic 250. If the memory device 110a is a master memory device, the control logic 250 may generate the back channel command BCMD and may transmit the back channel command BCMD to slave memory devices through the back channel command I/F 260.

In an exemplary embodiment, the back channel command BCMD may be a refresh command or a command requesting device information such as temperature information or bank information indicating to a bank which is most frequently accessed for a predetermined time, but the present inventive concept is not limited thereto.

The BDAT I/F 270 may communicate the back channel data BDAT with other memory devices. If the memory device 110a is a master memory device, the BDAT I/F 270 may receive the back channel data BDAT from slave memory devices. If the memory device 110a is a slave memory device, the BDAT I/F 270 may transmit the back channel data BDAT to a master memory device. For example, the slave memory device 110a may generate the back channel data BDATA and output the back channel data BDATA to a master memory device of a memory system of FIGS. 1-3 and 6-8, for example. Alternatively, if the memory device 110a is a slave memory device, the BDAT I/F 270 may transmit the back channel data BDATA to a master memory device through another slave memory device of a memory system of FIGS. 4 and 5, for example. The back channel data BDAT may be device information including the acknowledgement ACK of the back channel command BCMD, state information of a memory device, data stored in a memory core of the memory device, or information internally detected in the memory device, but the present inventive concept is not limited thereto.

The clock unit 290 may receive an external clock signal ECLK and a clock enable signal CKE, from the memory controller 200 and may generate an internal divided clock signal DCLK. The clock unit 290 may include a frequency divider (not shown) which receives the external clock signal ECLK and generate the internal divided clock signal DCKL with reference to the external clock signal ECLK. The internal divided clock signal DCLK may have a frequency which is smaller than the frequency of the external clock signal ECLK. For example, the frequency of the internal divided clock signal DCLK may be the frequency of the external clock signal ECLK divided by an integer greater than at least one. The relationship among the external clock signal ECLK, the clock enable signal CKE, and the internal divided clock signal DCLK will be described with reference to FIG. 11 later.

Referring back to an exemplary embodiment of FIG. 2, the memory device 110a may be used as memory devices 110-1A through 110-4A. In this case, each memory device may generate the internal divided clock signals DCLK_A through DCLK_D of FIG. 11, and the memory devices 110-1A through 110-4A may perform a back channel command BCMD generated by the master memory device 110-1A at substantially the same time with reference to the internal divided clock signals DCLK_A through DCLK_D generated by the memory devices 110-1A through 110-4A, respectively.

Referring back to an exemplary embodiment of FIG. 3, if the memory device 110a is used as a master memory device 110-1A, the clock unit 290 may generate a first back channel clock signal BCLK1, output the first back channel clock signal through a pin 340 and distribute using the back channel clock bus 155 the first back channel clock signal BCLK1 to the slave memory devices 110-2A through 110-4A.

If the memory device 110a is used as one of the slave memory devices 110-2A through 110-4A, the memory device 110a receives, using the pin 340, a second back channel clock signal BCLK2 transmitted through the back channel clock bus 155.

In an exemplary embodiment, the first back channel clock signal BCLK1 and the second back channel clock signal BCLK2 may be outputted and inputted, respectively, through a pin 340. For example, if the memory device 110a is set to a master memory device, the first back channel clock signal BCLK1 is outputted through the pin 340; if the memory device 110a is set to a slave memory device, the second back channel clock signal BCLK2 is inputted through the same pin 340.

Depending on a logic level of the clock enable signal CKE, the clock unit 290 may generate the back channel clock signal BCLK1 based on a clock signal outputted by an oscillator or generate the back channel clock signal based on an internal clock signal generated with reference to the external clock signal using a frequency divider. In an exemplary embodiment, the clock unit 290 may include the oscillator and/or the frequency divider. The relationship between the clock enable signal CKE and the back channel clock signal BCLK will be described with reference to FIGS. 13 and 14 later.

Referring to FIGS. 2 and 3, the control logic 250 of the master memory device 110-1 and 110-1A may generate an internal command as the back channel command and output the internal command through the BCMD I/F 260 of the master memory device 110-1 and 110-A1 to slave memory devices 110-2 through 110-4 and 110-2A through 110-4A. The control logic 250 may also perform the internal command on the memory core 210 of the master memory device 110-1 and 110-1A.

If the memory device 110a is set to a slave memory device, the BCMD I/F 260 may receive an internal command outputted from a master memory device and transmit the internal command to the control logic 250. The control logic 250 of each memory device may perform the internal command at substantially the same time with reference to the internal divided clock BCLK_A through BCLK_D of the memory system 10A of FIG. 2 or with reference to the back channel clock BCLK of the memory system 10A' of FIG. 3.

For the convenience of description, clock generation was made with reference to the exemplary embodiments of FIGS. 2 and 3. The present inventive concept is not limited thereto. The clock generation may be applied to other exemplary memory systems.

Figure 10:
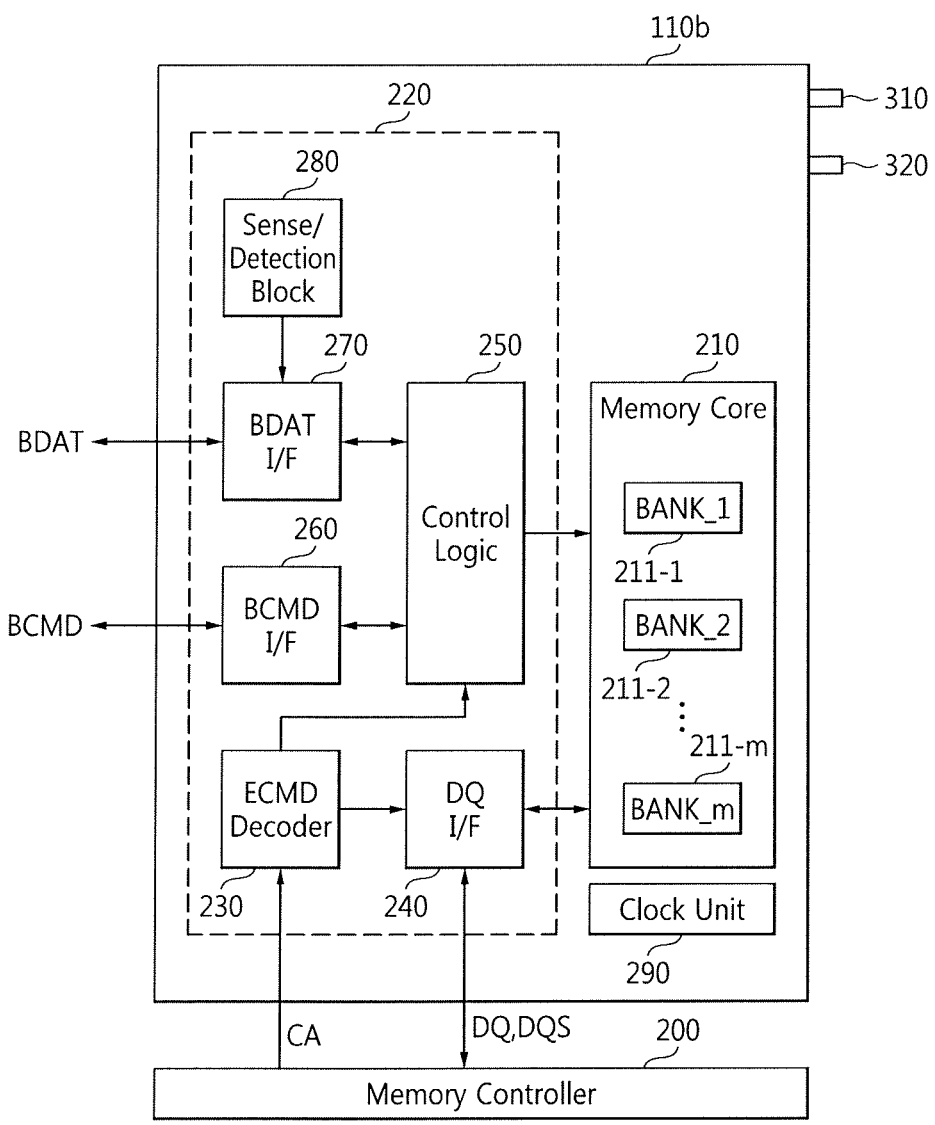
FIG. 10 is a diagram of a memory device in the memory systems of FIGS. 1 through 8 according to other embodiments of the inventive concept.

FIG. 10 is a diagram of a memory device 110b according to an exemplary embodiment of the present inventive concept. The memory device 110b may be included in the memory systems 10 and 10A through 10D of FIGS. 1 through 8. Referring to FIGS. 1 through 10, the structure and operations of the memory device 110b of FIG. 10 are similar to those of the memory device 110a of FIG. 9, and therefore, description will be focused on differences from the memory device 110a.

As compared to the memory device 110a of FIG. 9, the memory device 110b of FIG. 10 further includes a sense/detection block 280. The sense/detection block 280 is a circuit which measures or detects device information of the memory device 110b. For example, the sense/detection block 280 may include an internal temperature sensor (not shown) which measures internal temperature of the memory device 110b.

Referring back to an exemplary embodiment of FIG. 1, each of first through fourth memory devices 110-1 through 110-4 may detect temperature information using its internal temperature sensor. The memory device 110b of FIG. 10 may be used as the master memory device 110-1 or the slave memory devices 110-2 through 110-4 depending on a pin connection or a mode register value, for example. The detected temperature information may be transmitted to other memory devices so that the memory devices 110-1 through 110-4 share the temperature information with one another. For example, the slave memory devices 110-2 through 110-4 may transmit temperature information of the slave memory devices 110-2 through 110-4 to the master memory device. Then, the master memory device 110-1 may have the temperature information of the first through fourth memory devices 110-1 through 110-4.

In an exemplary embodiment, the master memory device 110-1 may generate a command for a refresh operation having a refresh interval which is set based on the highest temperature information of the first through fourth memory devices 110-1 through 110-4. For example, the control logic 250 of the master memory device 110-1 may adjust the refresh interval based on the highest temperature information, and may transmit the command as a back channel command to slave memory devices 110-2 through 110-4 through the BCMD I/F 260. Accordingly, the memory devices 110-1 through 110-4 may perform a refresh operation in response to the back channel command BCMD if the back channel command BCMD corresponds to a refresh operation. In an exemplary embodiment, the refresh command which is internally generated by the master memory device 110-1 may be a per-bank refresh command. At least one of the banks 211_1 through 211_4, if in condition of refresh starvation, may be independently refreshed using a respective per-bank refresh command.

Referring back to an exemplary embodiment of FIG. 8, the master memory device 110-1 may have the temperature information of the first through fourth memory devices 110-1 through 110-4 and may inform the memory controller 200 of the highest temperature information among the temperature information of the first through fourth memory devices 110-1 through 110-4 of FIG. 1. In this case, the memory controller 200 of FIG. 8 may adjust a timing parameter of a command provided through the external command bus 130 based on the highest temperature information.

In an exemplary embodiment, the master memory device 110-1 may share the temperature information received from the slave memory devices 110-2 through 110-4 and the temperature information of the master memory device 110-1 with each of the slave memory devices 110-2 through 110-4.

As described above, information detected in each of memory devices is shared with other memory devices, so that a refresh operation or timing parameters of each memory device may be adjusted based on the information indicating to the worst operating condition of the memory devices 110-1 through 110-4 included in the memory system 10. In an exemplary embodiment, the information indicating to the worst operation condition may be the highest temperature in a memory system.

In an exemplary embodiment, referring back to an exemplary embodiment of FIG. 1, the sense/detection block 280 may include a most frequent row address detector (not shown) which detects most frequently accessed row address information in a bank of the memory core 210. The most frequent row address information is a row address which has been accessed most frequently in a predetermined bank of each memory device in the memory system 10. The memory devices 110-1 through 110-4 may have different predetermined bank from each other to monitor most frequently accessed row address in each predetermined bank.

For the convenience of description, it is assumed that each memory device includes four banks. It is further assumed that the predetermined bank of the first memory device 110-1 is a first bank 211-1; the predetermined bank of the second memory device 110-2 is a second bank 211-2; the predetermined bank of the third memory device 110-3 is a third bank 211-3; and the predetermined bank of the fourth memory device 110-4 is a fourth bank 211-4.

In this case, a most frequent row address detector (not shown) of the first memory device 110-1 may detect an address of a row that has been most frequently accessed in the first bank 211-1 and may store the address as first most frequently accessed row address information. A most frequent row address detector of the second memory device 110-2 may detect an address of a row that has been most frequently accessed in the second bank 211-2 and may store the address as second most frequently accessed row address information. A most frequent row address detector of the third memory device 110-3 in FIG. 1 may detect an address of a row that has been most frequently accessed in the third bank 211-3 and may store the address as third most frequently accessed row address information. A most frequent row address detector of the fourth memory device 110-4 may detect an address of a row that has been most frequently accessed in the fourth bank 211-4 and may store the address as fourth most frequently accessed row address information.

The slave memory devices 110-2 through 110-4 may transmit the second through fourth most frequently accessed row address information to the first memory device 110-1. Then, the master memory device 110-1 may transmit the first through fourth most frequently accessed row address information to each of the slave memory devices 110-2 through 110-4. Accordingly, the memory devices 110-1 through 110-4 of FIG. 1 may store the most frequently accessed row address information of the predetermined banks 211-1 through 211-4 of the memory devices 110-1 through 110-4, respectively. Using the most frequently accessed row address information, each memory device may perform a row hammer operation.

As described above, a predetermined bank is assigned to each of memory devices, most frequently accessed row address information of the predetermined bank is detected, and the detected most frequently accessed row address information is shared among all of the memory devices through a back channel data bus. According to an exemplary embodiment of the inventive concept, an internal command or data internally generated in each of memory devices is shared with other memory devices, so that each memory device may perform an internal operation (e.g., a per-bank refresh operation) without control or intervention of a memory controller. As described above, the detection of the most frequently accessed row address is distributed among the memory devices by assigning a predetermined bank to each memory device. In an exemplary embodiment, the predetermined bank may be different among the memory devices. In an exemplary embodiment, a number of the predetermined bank may be equal to or greater than one.

Figure 11:
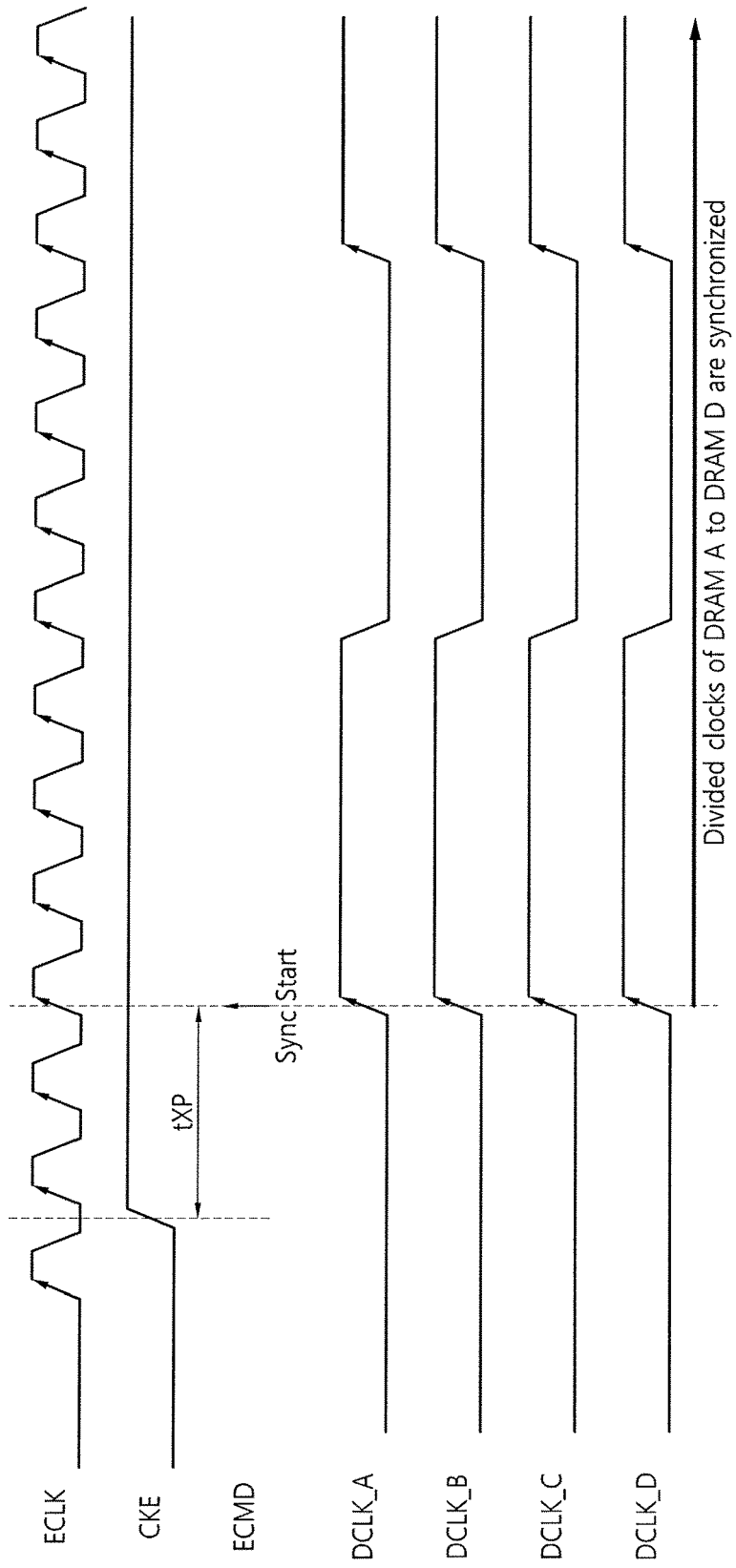
FIG. 11 is a timing chart showing the operation of a memory system according to an exemplary embodiment of the inventive concept.

FIG. 11 shows a timing chart for generating an internal divided clock used in a memory system according to an exemplary embodiment of the inventive concept. The internal divided clocks DCLK_A through DCLK_D are generated at a predetermined time tXP after a clock enable signal CKE is enabled. For the convenience of description, it is assumed that the timing chart shows the operation of the memory system 10A of FIG. 2.

Referring to FIGS. 2, 9, and 11, the memory devices 110-1A through 110-4A receive an external clock signal ECLK and a clock enable signal CKE and divide the frequency of the external clock signal ECLK to generate internal divided clock signals DCLK_A through DCLK_D, respectively. The clock unit 290 of each of the memory devices 110-1A through 110-4A may generate the internal divided clock signals DCLK_A through DCLK_D synchronized with the external clock signal ECLK when the predetermined time tXP has elapsed from enabling (i.e., transition from a low level to a high level) of the clock enable signal CKE. In an exemplary embodiment, the clock unit 290 may include a clock divider to generate the internal divided clock signal DLCK. For example, the predetermined time tXP, as a power-down exit parameter, amounts to two clock cycles of the external clock signal ECLK after the clock enable signal CKE transitions from a low level to a high level. In this case, the internal divided clock signal DCLK is generated two cycles after the external clock signal ECLK transitions from the low level to the high level, synchronized with the rising edge of the external clock signal ECLK. The present inventive concept is not limited thereto, and the predetermined time tXP may have various number of clock cycles of the external clock signal.

The memory controller 200 may apply an external command ECMD to the memory devices 110-1A through 110-4A after the predetermined time tXP from the enabling (i.e., transition from the low level to the high level) of the clock enable signal CKE.

As described above, according to an exemplary embodiment of the present inventive concept, the starts of the internal divided clock signals DCLK_A through DCLK_D of the respective memory devices 110-1A through 110-4A are synchronized with one another using the external clock signal ECLK and the clock enable signal CKE which are shared among the memory devices 110-1A through 110-4A. Accordingly, each of the memory devices 110-1A through 110-4A may communicate the back channel command BCMD and/or the back channel data BDAT with other memory devices using the internal divided clock signals DCLK_1A through DCLK_4A synchronized with each other.

Figure 12:
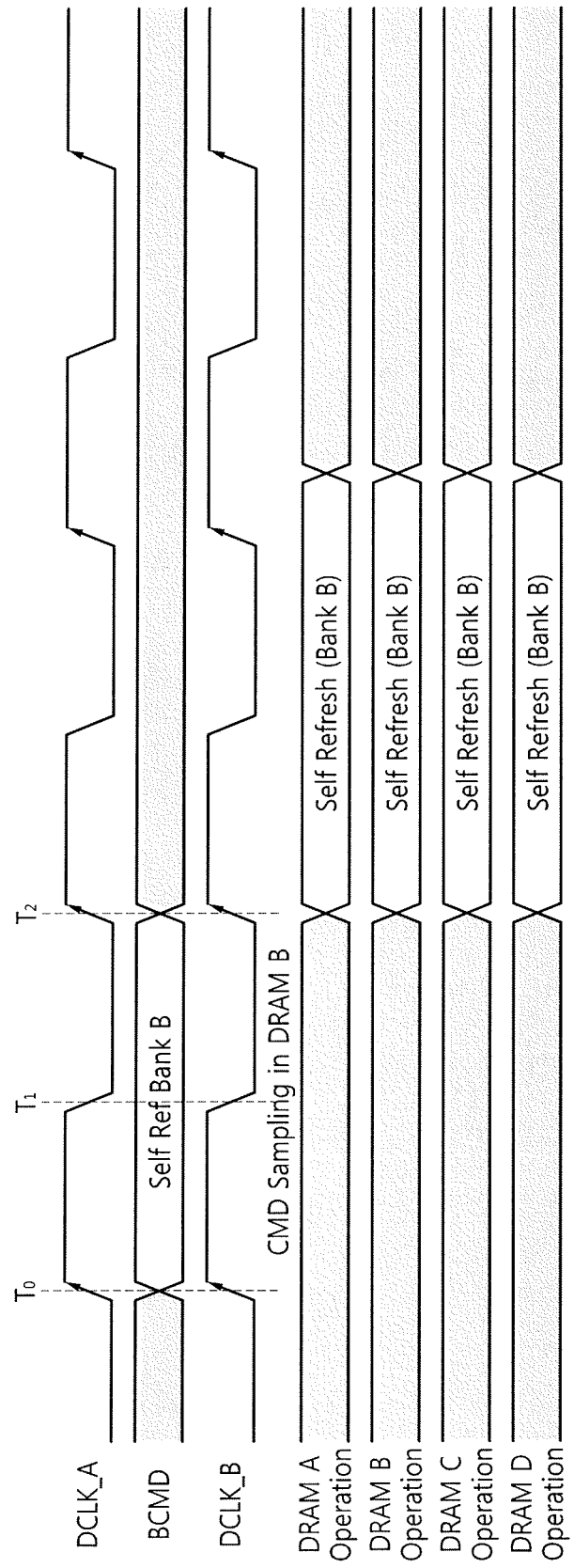
FIG. 12 is a timing chart showing the operation of a memory system according to other embodiments of the inventive concept.

FIG. 12 shows a timing chart for an operation of a memory system according to an exemplary embodiment of the present inventive concept. FIG. 12 shows that a self-refresh operation is performed by memory devices at substantially the same time with reference to internal divided clocks DCLK_A through DCLK_D of FIG. 11. For the convenience of description, it is assumed that the timing chart shows the operation of the memory system 10A of FIG. 2.

Referring to FIGS. 2, 9 and 12, the master memory device 110-1A may generate and transmit a back channel command BCMD to the slave memory devices 110-2A through 110-4A in synchronization with the first internal divided clock signal DCLK_A. The back channel command BCMD may be a self-refresh command which is generated by the master memory device 110-1A. For the convenience of description, the self-refresh command is for a second bank, but inventive concept is not limited thereto.

For instance, the master memory device 110-1A may transmit the self-refresh command for the second bank, which may be referred to as the second bank self-refresh command, to the slave memory devices 110-2A through 110-4A in response to a rising edge of the first internal divided clock signal DCLK_A at time T0. The slave memory devices 110-2A through 110-4A may sample the second bank self-refresh command in response to a falling edge of each internal divided clock signal DCLK_B through DCLK_D at timing T1.

Each of the memory devices 110-1A and 110-4A may execute the second bank self-refresh command in response to the immediate next rising edge of the internal divided clock signals DCLK_A through DCLK_D at timing T2. Accordingly, the memory devices 110-1A through 110-4A may execute the second bank self-refresh command at substantially the same time with reference to the internal divided clock signals DCLK_A through DCLK_D, for example, at the timing of T2.

In an exemplary embodiment, each of the banks 211-1 through 211-4 are refreshed by an independent bank self-refresh command generated by the master memory device 110-1. The bank self-refresh command may be referred to a per-bank self refresh command. For example, the first bank 211-1 may be refreshed by a first bank self-refresh command, the third bank 211-3 may be refreshed by a third bank self-refresh command and the fourth bank 211-4 may be refreshed by a fourth bank self-refresh command.

Figure 13:
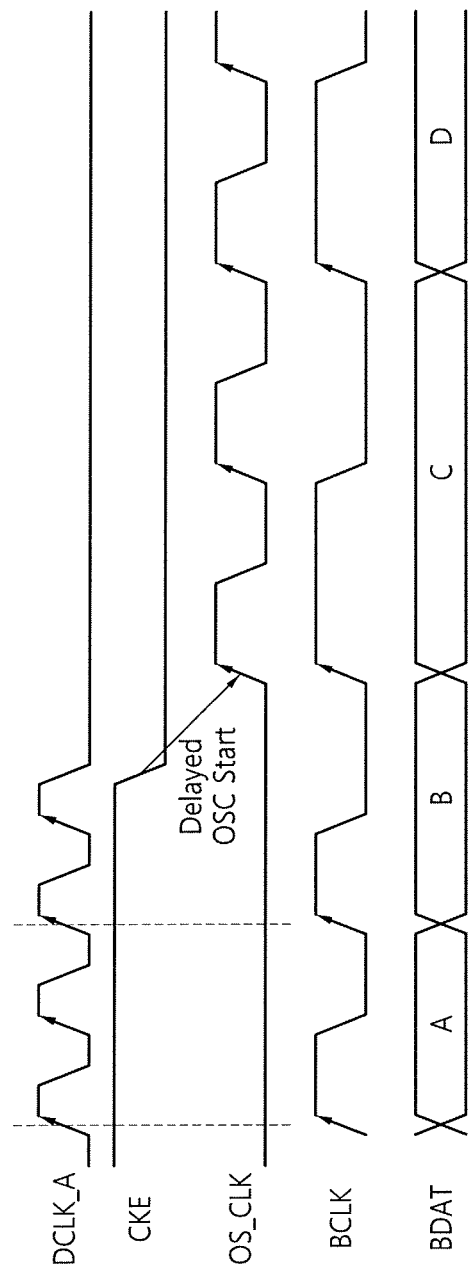
FIG. 13 is a timing chart showing the operation of a memory system according to still other embodiments of the inventive concept.
Figure 14:
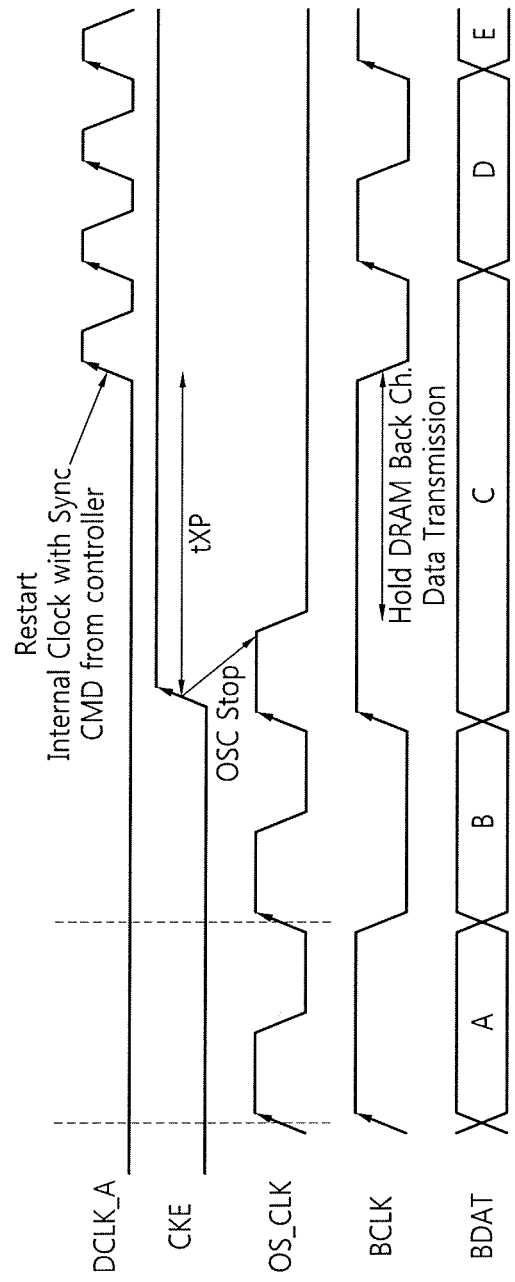
FIG. 14 is a timing chart showing the operation of a memory system according to further embodiments of the inventive concept.

FIGS. 13 and 14 are timing charts for generating a back channel clock used in a memory system according to an exemplary embodiment of the inventive concept. FIG. 13 is a timing chart of the operation if the clock enable signal CKE is disabled in one of the memory systems 10 and 10A through 10D of FIGS. 1 through 8. FIG. 14 is a timing chart of the operation if the clock enable signal CKE is enabled in one of the memory systems 10 and 10A through 10D of FIGS. 1 through 8. For the convenience of description, it is assumed that the timing chart shows the operation of the memory system 10A' of FIG. 3.

Referring to FIGS. 3 and 13, if the clock enable signal CKE is disabled, the memory devices 110-1A through 110-4A ignore the external clock signal ECLK, and therefore, the internal divided clock signal DCLK is not generated from the external clock signal ECLK. As a result, the internal divided clock signals DCLK_A through DCLK_D of the respective memory devices 110-1A through 110-4A are not generated. In an exemplary embodiment, a low level of the clock enable signal CKE may be referred to as "disabled".

For example, the master memory device 110-1A may generate a back channel clock signal BCLK using an internal oscillator and may transmit the back channel clock signal BCLK to the slave memory devices 110-2A through 110-4A through the back channel clock bus 155. The master memory device 110-1A may generate an oscillation clock signal OS_CLK using the internal oscillator at a predetermined delay time after the external clock signal ECLK clock enable signal CKE is disabled and may generate the back channel clock signal BCLK by dividing the frequency of the oscillation clock signal OS_CLK. The first memory device 110-1A may transmit the back channel clock signal BCLK to the slave memory devices 110-2A through 110-4A using the back channel clock bus 155.

The master memory device 110-1A may transmit a back channel command BCMD and/or the back channel data BDAT to the slave memory devices 110-2A through 110-4A in synchronization with the back channel clock signal BCLK. In an exemplary embodiment, the slave memory devices 110-2A through 110-4A may transmit back channel data BDAT to the master memory device 110-1A in synchronization with the back channel signal BCLK.

Referring to FIGS. 3 and 14, when the clock enable signal CKE is enabled, each of the memory devices 110-1A through 110-4A divides the frequency of the external clock signal ECLK to generate the internal divided clock signals DCLK_A through DCLK_D at substantially the same time with reference to the external clock signal ECLK. The timing of generating the internal divided clock signals DCLK_A through DCLK_D has been described above with reference to FIG. 11.

In an exemplary embodiment, a high level of the clock enable signal CKE may be referred to as "enabled".

If the clock enable signal CKE is enabled, the internal oscillators of the memory devices 110-1A through 110-4A are disabled in response to the clock enable signal CKE. Accordingly, the oscillation clock signal OS_CLK is not generated. During a predetermined time tXP, the memory system does not communicate the back channel data BDAT or the back channel command BCMD between the memory devices 110-1A through 110-4A. For example, the back channel data BDAT and/or the back channel command BCMD may be held until the first internal divided clock signal DCLK_A is generated. After the predetermined time tXP, the first master memory device 110-1A may transmit the back channel data BDAT or the back channel command BCMD to the slave memory devices 110-2A through 110-4A using the back channel clock signal in synchronization with the first internal divided clock signal DCLK_A.

Figure 15:
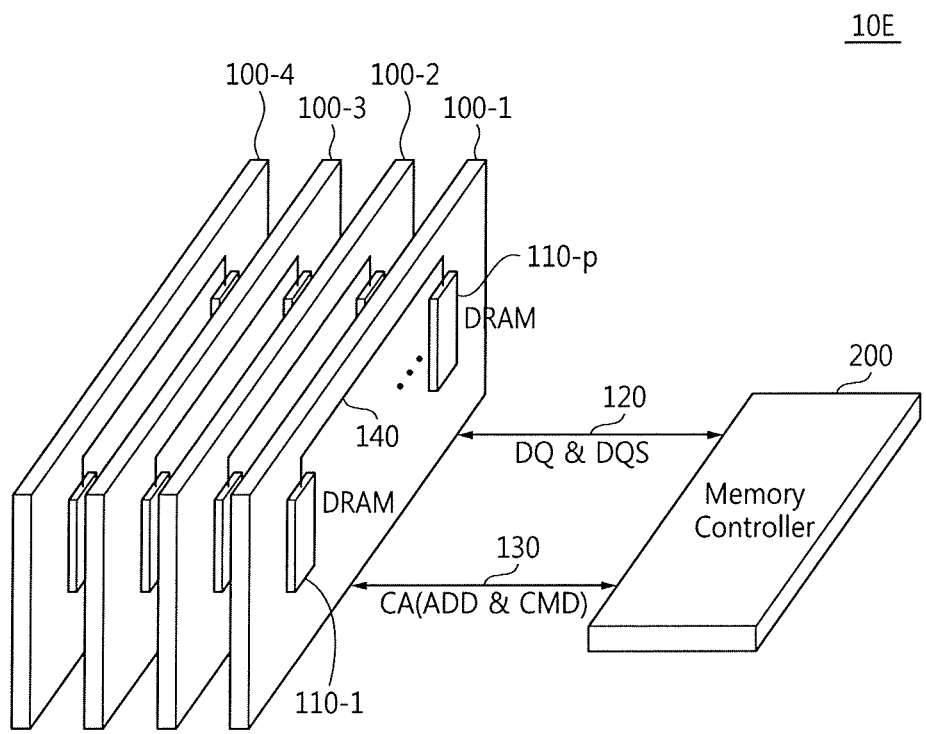
FIG. 15 is a diagram of a memory system according to further embodiments of the inventive concept.

FIG. 15 is a diagram of a memory system 10E according to an exemplary embodiment of the present inventive concept. Referring to FIG. 15, the memory system 10E includes a plurality of memory modules 100-1 through 100-4 and the memory controller 200. Each of the memory modules 100-1 through 100-4 may be one of the exemplary memory modules 100A through 100D of FIGS. 1 through 8.

Figure 16:
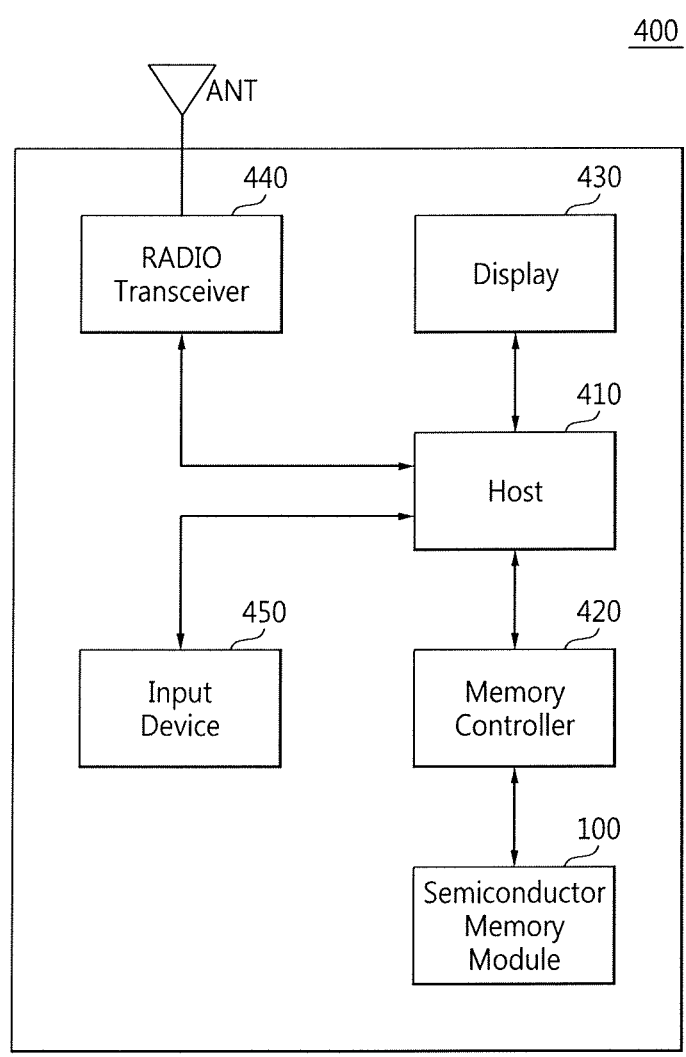
FIG. 16 is a diagram of a computer system including a memory module according to an exemplary embodiment of the inventive concept.

FIG. 16 is a diagram of a computer system 400 including a memory module 100 according to an exemplary embodiment of the present inventive concept. Referring to FIG. 16, the computer system 400 may be implemented as a cellular phone, a smart phone, a personal digital assistant (PDA), or a radio communication system. The computer system 400 includes the memory module 100 and a memory controller 420 controlling the operations of the memory module 100. The memory module 100 may be one of the exemplary memory modules 100A through 100D of FIGS. 1 through 8.

The memory controller 420 may control a data access operation including a write operation or a read operation, of the memory module 100 according to the control of a host 410. The memory controller 420 may be the memory controller 200 of FIG. 1.

Data in the memory module 100 may be displayed through a display 430 according to the control of the host 410 and the memory controller 420. A radio transceiver 440 may transmit or receive radio signals through an antenna ANT. The radio transceiver 440 may convert radio signals received through the antenna ANT into signals to be processed by the host 410. The host 410 may process the signals output from the radio transceiver 440 and transmit the processed signals to the memory controller 420 or the display 430. The memory controller 420 may store the signals processed by the host 410 in the memory module 100. The radio transceiver 440 may also convert signals output from the host 410 into radio signals and may output the radio signals to an external device through the antenna ANT.

An input device 450 may control signals for controlling the operation of the host 410 or data to be processed by the host 410 to be input to the computer system 400. The input device 450 may be implemented as a pointing device such as a touch pad or a computer mouse, a keypad, or a keyboard.

The host 410 may control the operation of the display 430 to display data output from the memory controller 420, data output from the radio transceiver 440, or data output from the input device 450. The memory controller 420, which controls the operations of the memory module 100, may be implemented as a part of the host 410 or as a separate chip.

Figure 17:
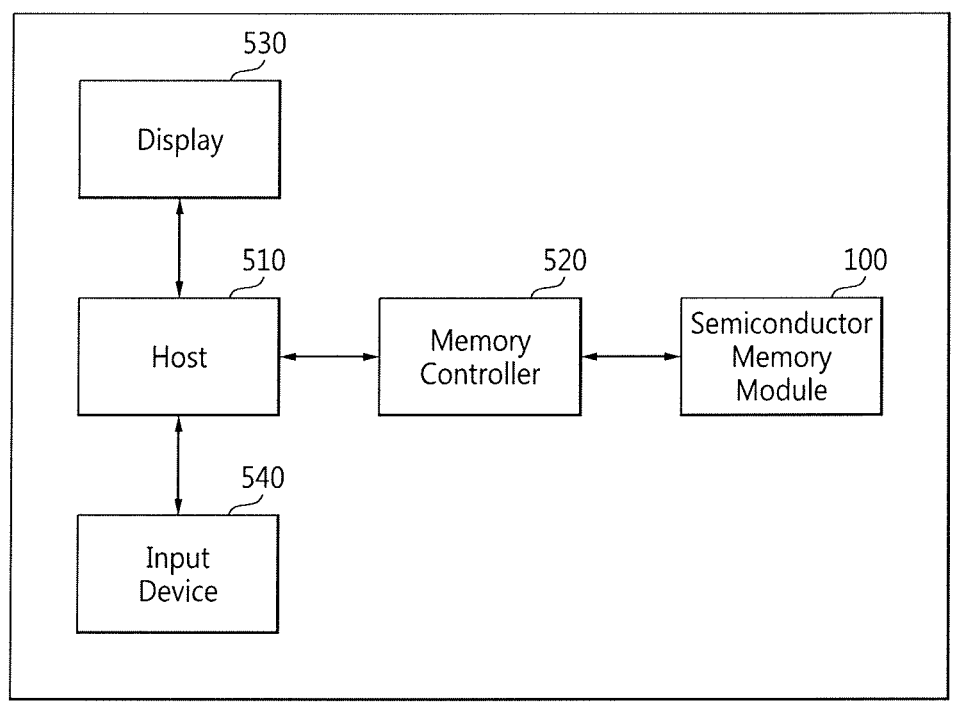
FIG. 17 is a block diagram of a computer system including a memory module according to other embodiments of the inventive concept.

FIG. 17 is a block diagram of a computer system 500 including a memory module 100 according to an exemplary embodiment of the present inventive concept. The computer system 500 may be implemented as a personal computer (PC), a tablet PC, a netbook, an e-reader, a personal digital assistant (PDA), a portable multimedia player (PMP), an MP3 player, or an MP4 player.

The computer system 500 includes a host 510, the memory module 100, a memory controller 520 controlling the data processing operations of the memory module 100, a display 530 and an input device 540.

The memory module 100 may be one of the memory modules 100A through 100D of FIGS. 1 through 8.

The host 510 may display data stored in the memory module 100 through the display 530 according to data input through the input device 540. The input device 540 may be implemented by a pointing device such as a touch pad or a computer mouse, a keypad, or a keyboard.

The host 510 may control the overall operation of the computer system 500 and the operations of the memory controller 520. The memory controller 520 may be the memory controller 200 of FIG. 1.

Figure 18:
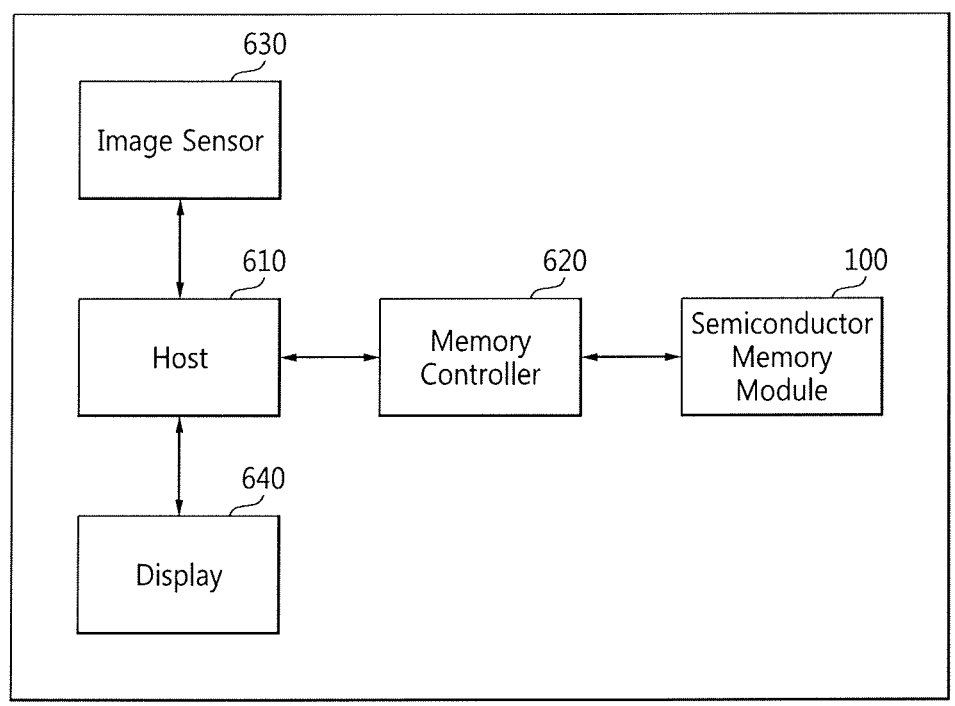
FIG. 18 is a block diagram of a computer system including a memory module according to still other embodiments of the inventive concept.

FIG. 18 is a block diagram of a computer system 600 including a memory module 100 according to an exemplary embodiment of the present inventive concept. The computer system 600 may be implemented as an image processing device like a digital camera, a cellular phone equipped with a digital camera, or a smart phone equipped with a digital camera.

The computer system 600 includes a host 610, the memory module 100 and a memory controller 620 controlling the data processing operations, such as a write operation or a read operation, of the memory module 100. The computer system 600 further includes an image sensor 630 and a display 640.

The memory module 100 may be one of the memory modules 100A through 100D of FIGS. 1 through 8.

The image sensor 630 included in the computer system 600 converts optical images into digital signals and outputs the digital signals to the host 610 or the memory controller 620. The digital signals may be controlled by the host 610 to be displayed through the display 640 or stored in the memory module 100 through the memory controller 620.

Data stored in the memory module 100 may be displayed through the display 640 according to the control of the host 610 or the memory controller 620. The memory controller 620, which may control the operations of the memory module 100, may be implemented as a part of the host 610 or as a separate chip. The memory controller 620 may be the memory controller 200 of FIG. 1.

Figure 19:
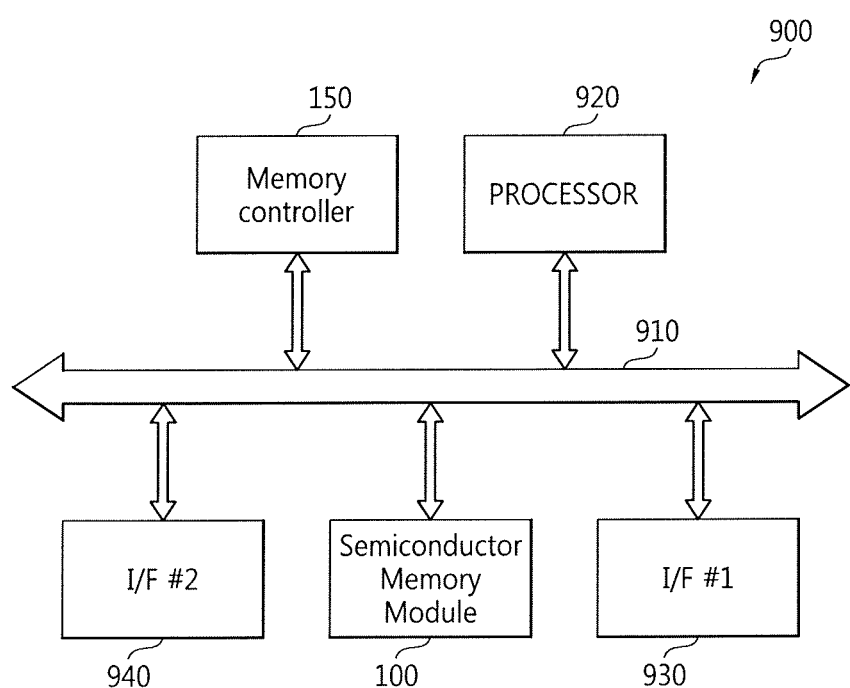
FIG. 19 is a block diagram of a computer system including a memory module according to even other embodiments of the inventive concept.

FIG. 19 is a block diagram of a computer system 900 including a memory module 100 according to an exemplary embodiment of the inventive concept. The computer system 900 includes the memory module 100, a memory controller 150, a processor 920 a first interface 930 and a second interface 940 which are connected to a data bus 910.

According to an exemplary embodiment, the computer system 900 includes a portable device such as a mobile phone, MP3 (MPEG Audio Layer-3) player, or MP4 (MPEG Audio Layer-4) player, a personal digital assistant (PDA), or a portable media player (PMP).

According to an exemplary embodiment, the computer system 900 includes a data processing system such as a personal computer (PC), a notebook-sized personal computer or a laptop computer.

According to an exemplary embodiment, the computer system 900 includes a memory card such as a secure digital (SD) card or a multimedia card (MMC)

According to an exemplary embodiment, the computer system 900 includes a smart card or a solid state drive (SSD)

The memory module 100, the memory controller 150 and the processor may be implemented as one chip, for example, a system on chip (SoC) or as separate devices.

According to an exemplary embodiment, the processor 920 may process data input through the first interface 920 and write the data in the semiconductor memory device 100.

According to an exemplary embodiment, the processor 920 may read data from the semiconductor memory device 100 and output the data through the first interface 930. In this case, the first interface 930 may be an input/output device.

The second interface 940 may be a wireless interface for wireless communication.

According to an exemplary embodiment, the second interface 940 may be implemented by software or firmware.

Figure 20:
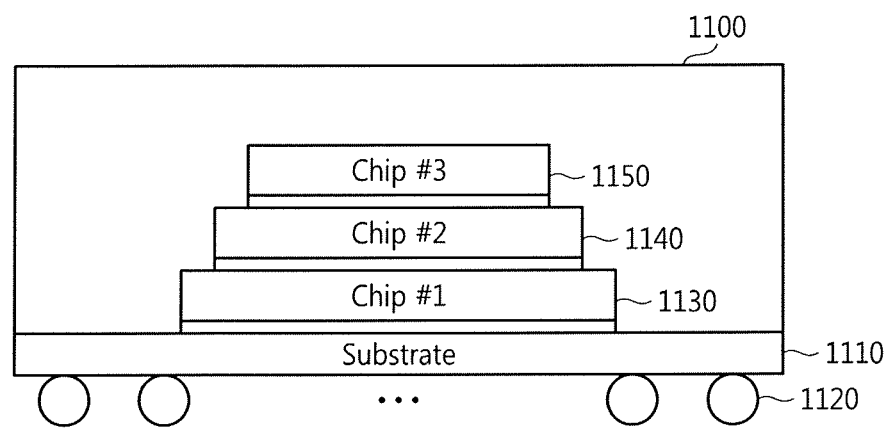
FIG. 20 is a schematic conceptual diagram of a multi-chip package including a memory module according to an exemplary embodiment of the inventive concept.
Figure 21:
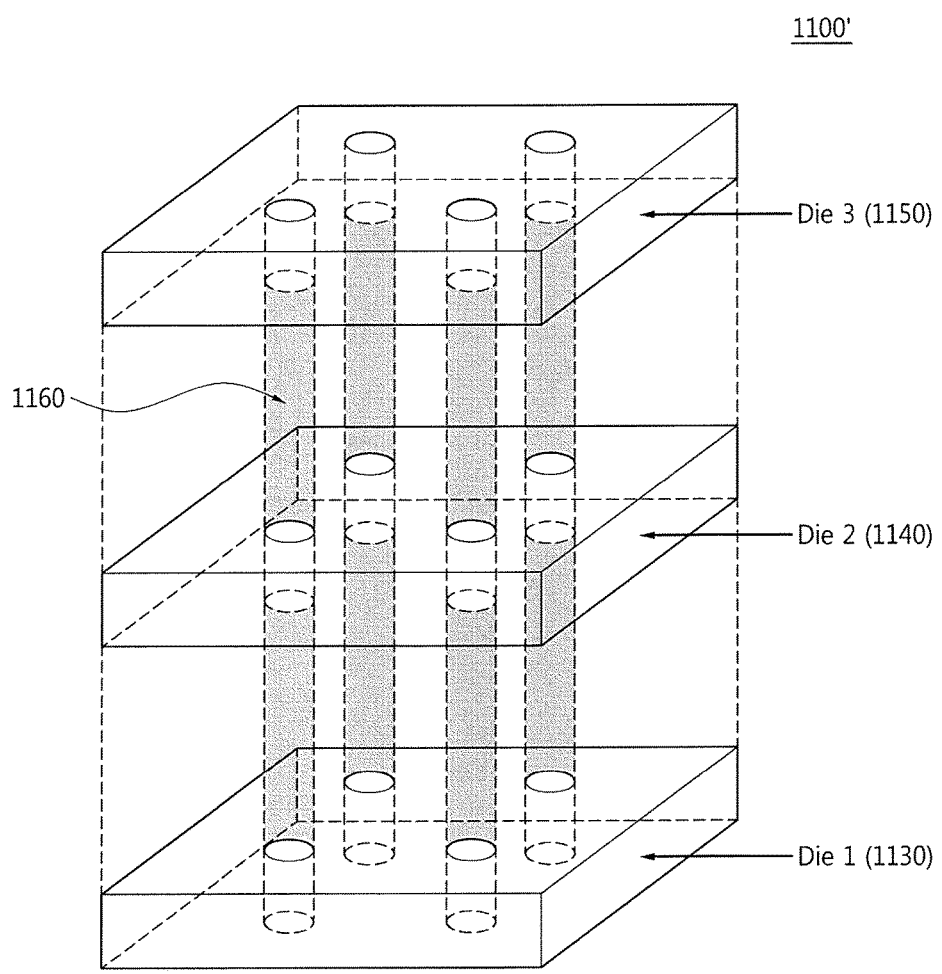
FIG. 21 is a three-dimensional conceptual diagram of an example of the multi-chip package of FIG. 20.

FIGS. 20 and 21 show a multi-chip package 1100 including a memory module according to an exemplary embodiment of the present inventive concept. FIG. 21 is a three-dimensional diagram of the multi-chip package 1100 of FIG. 20. Referring to FIG. 20, the multi-chip package 1100 includes a plurality of semiconductor devices first through third chips 1130, 1140, and 1150 which are sequentially stacked on a package substrate 1110. All or some of the plurality of semiconductor devices 1130 through 1150 may constitute one of the memory modules 100A through 100D of FIGS. 1 through 8. A memory controller (not shown) for controlling the operations of the semiconductor devices 1130 through 1150 may be included within at least one of the semiconductor devices 1130 through 1150 or may be implemented on the package substrate 1110. A through-silicon via (TSV) (not shown), a bonding wire (not shown), a bump (not shown), or a solder ball 1120 may be used to electrically connect the semiconductor devices 1130 through 1150 with one other. The memory controller (not shown) may be the memory controller 200 of FIG. 1.

Referring to FIGS. 20 and 21, the multi-chip package 1100 includes a plurality of the dies 1130 through 1150 connected with one another through through-silicon vias (TSVs) 1160 in a stack structure. A die may be referred to as a semiconductor device disposed within a chip. For example, dies Die1 through Die3 are disposed within the chips 1130 through 1150, respectively. Each of the dies 1130 through 1150 includes a plurality of circuit blocks (not shown) and a periphery circuit to perform the functions of the semiconductor memory device 100. The dies Die1 through Die3 may be referred to as a cell array. The plurality of circuit blocks may be implemented by memory blocks.

The TSVs 1160 may be formed of a conductive material including a metal such as copper (Cu). The TSVs 1160 penetrate the dies Die1 through Die3. For example, the dies Die1 through Die 3 may include a silicon substrate. The silicon substrate surrounds the TSVs 1160. An insulating region (not shown) may be disposed between the TSVs 1160 and the silicon substrate.

As described above, according to an exemplary embodiment of the present inventive concept, each of memory devices may communicate its internal command or data with other memory devices through an inter-memory bus, so that the internal command and data are shared among the memory devices. In addition, a clock signal used for the transmission of the internal command or data is synchronized among the memory devices, so that an internal command or data generated in one of the memory devices may be transmitted to other memory devices without timing errors. Moreover, since an internal command or data generate in one of the memory devices is shared with the other memory devices, each memory device performs an internal operation (e.g., a per-bank refresh operation) without control of intervention of a memory controller and is assigned its share of role. In an exemplary embodiment, the internal command may include a per-bank refresh command or an active refresh command which are internally generated without intervention of a memory controller. The specification of U.S. patent application Ser. No. 14/959,003, which is hereby incorporated by reference, describes the per-bank refresh command and the active refresh command.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed:

1. A method of operating a memory system comprising a memory controller, a plurality of memory devices including a master memory device and slave memory devices, a back channel bus coupling the master memory device to the slave memory devices and a channel coupling the memory controller to the plurality of memory devices, the method comprising:

receiving, by the master memory device, device information from each of the slave memory devices through the back channel bus;
   determining, by the master device, which of the slave memory devices need refreshing based on the device information received from each of the slave memory devices;
   generating, by the master memory device, a refresh command when the determining determines that at least one of the slave memory devices need refreshing; and
   outputting, by the master memory device, the refresh command through the back channel bus to the slave memory devices that were determined to need refreshing.

2. The method of claim 1, wherein the slave memory devices that receive the refresh command, start executing the refresh command at substantially the same time.

3. The method of claim 1, wherein a predetermined pin of the master memory device is set to a first voltage to indicate a master and a predetermined pin of each of the slave memory devices is set to a second voltage different from the first voltage to indicate slaves.

4. The method of claim 1, wherein each of the master memory device and the slave memory devices include a mode register, where the mode register of the master memory device is set to a first value to indicate a master and the mode register of each of the slave memory devices is set to a second value different from the first value to indicate slaves.

5. The method of claim 1, wherein the master memory device is interconnected to the slave memory devices in parallel through the back channel bus.

6. The method of claim 2, further comprising:
   generating, by the master device, a back channel clock signal; and
   outputting, by the master device, the back channel clock signal through the back channel bus to the slave memory devices,
   wherein the slave memory devices that receive the refresh command start executing the refresh command at substantially the same time with reference to the back channel clock signal.

7. The method of claim 6, further comprising:
   receiving, by the master memory device, a clock enable signal and an external clock signal;
   generating, by the master memory device, a first clock signal at a first predetermined time after a first transition of the clock enable signal, wherein the first clock signal is synchronized with the external clock signal; and
   generating, by the master memory device, the back channel clock signal synchronized with the first clock signal, wherein a frequency of the first clock signal is greater than a frequency of the back channel clock signal.

8. The method of claim 7, further comprising:
   holding, by the master memory device, the refresh command during the first predetermined time; and
   outputting, by the master memory device, the refresh command to the slave memory devices that were determined to need refreshing after elapse of the first predetermined time.

9. The method of claim 7, further comprising:
   if a second transition of the clock enable signal occurs, generating a second clock signal by the master memory device at a second predetermined time after the second transition of the clock enable signal; and
   generating, by the master memory device, the back channel clock signal synchronized with the second clock signal,
   wherein a frequency of the second clock signal is greater than a frequency of the channel clock signal.

10. The method of claim 1, further comprising:
receiving, by the memory devices, a clock enable signal (CKE) and an external clock signal (ECLK);
generating an internal clock signal by each of the memory devices; and
wherein the refresh command is performed, with reference to the internal clock signal in each of the memory devices, by each of the memory devices.

11. The method of claim 10, wherein the internal clock signal is synchronized with the external clock signal at a first predetermined time after a first transition of the clock enable signal.

12. The method of claim 10, wherein the refresh command is a per-bank self-refresh command to refresh a single bank of the memory device that received the refresh command.

13. The method of claim 10, wherein each of the slave memory devices transmits, in response to an internal command received through the back channel, the device information including temperature information to the master memory device.

14. The method of claim 10, wherein each of the slave memory devices transmits, in response to an internal command received through the back channel, the device information including row address information indicating a row address in a predetermined bank of each of the slave memory devices which is most frequently accessed within a predetermined time.

15. A method of operating a memory system comprising a memory controller, a plurality of memory devices including a master memory device and slave memory devices, a back channel bus coupling the master memory device to the slave memory devices and a channel coupling the memory controller to the plurality of memory devices, the method comprising:
generating, by the master memory device, first device information of the master memory device indicating whether a refresh of the master memory device is needed;
receiving by the master memory device, second device information from each of the slave memory, devices through the back channel bus indicating whether a refresh of the corresponding slave memory device is needed;
generating, by the master memory device, device data including at least one of the first device information and the second device information received from each of the slave memory devices through the back channel; and
outputting, by the master memory device the device data through the channel to the memory controller.

16. The method of claim 15, wherein the first device information or the second device information includes bank row address information indicating a row address in a predetermined bank of a corresponding one of the memory devices which is most frequently accessed within a predetermined time.

17. The method of claim 16, further comprising:
performing, by the given memory device, a row hammer operation on memory cells of the corresponding one memory device associated with the row address, without intervention from the memory controller, to prevent the memory cells from losing their data.

18. A memory module including a plurality of memory devices, comprising:
a master memory device;
a plurality of slave memory devices;
a first channel shared by the master memory device and the slave memory devices, wherein the master device and the slave memory devices receive a first command from a memory controller through the first channel; and
a second channel electrically coupling the master memory device to the slave memory devices,
wherein the slave memory devices receive a second command generated and outputted from the master memory device through the second channel, and
wherein the master memory device and the slave memory devices start executing the second command at substantially the same time,
wherein the second command is a per-bank self-refresh command,
wherein the master memory device generates the second command only from information received through the second channel from each of the slave memory devices.

19. The memory module of claim 18, wherein the second channel comprises:
a command channel through which the second command is communicated from the master memory device to each of the slave memory devices; and
a data channel through which each of the slave memory devices communicates device information to the master memory device.

20. The method of claim 1, wherein the refresh command is different from a refresh command supplied by the memory controller.

21. The memory module of claim 18, wherein each of the slave memory devices refresh only a single bank therein in response to receipt of the per-bank self-refresh command.

* * * * *